United States Patent [19]

Suzumura et al.

[11] Patent Number: 4,503,504
[45] Date of Patent: Mar. 5, 1985

[54] ATTITUDE CONTROLLING DEVICE FOR A STEERING WHEEL

[75] Inventors: Nobuyasu Suzumura; Kazuyuki Umebayashi; Takahiro Yamada, all of Tokyo, Japan

[73] Assignee: Aisin Seiki Kabushiki Kaisha, Kariya, Japan

[21] Appl. No.: 401,154

[22] Filed: Jul. 23, 1982

[30] Foreign Application Priority Data

Aug. 21, 1981 [JP] Japan .................. 56-130884

[51] Int. Cl.³ .................. B62D 1/18; G06F 15/20
[52] U.S. Cl. .................. 364/425; 280/775; 74/493; 318/466
[58] Field of Search .................. 364/424, 425; 180/78; 280/775; 74/492, 493, 527; 318/466, 467

[56] References Cited

U.S. PATENT DOCUMENTS

| | | | |
|---|---|---|---|
| 4,075,903 | 2/1978 | Cornell | 280/775 |
| 4,101,147 | 7/1978 | Ederati et al. | 280/775 |
| 4,204,255 | 5/1980 | Cremer | 364/425 |
| 4,401,928 | 8/1983 | Kamijo et al. | 318/466 |
| 4,404,632 | 9/1983 | Harada et al. | 364/425 |
| 4,422,346 | 12/1983 | Nishikawa | 280/775 |

Primary Examiner—Gary Chin
Attorney, Agent, or Firm—Sughrue, Mion, Zinn, Macpeak, and Seas

[57] ABSTRACT

An electric mechanism and an electronic control device for use in setting the inclination and vertical position of a steering wheel of an automotive vehicle. The electronic control device functions to store the inclination and vertical position of the steering wheel, positions the steering wheel to its away position when a driver rides on or alights from the vehicle, thereby to provide no obstruction for the riding and alighting of the driver, and positions the steering wheel to the stored driving position after the driver rides on the vehicle. The electronic control device also stores an attitude of the steering wheel and an attitude of the driver's seat in relation to a code corresponding to each of the plural drivers. In addition, the electronic control device functions to release the door locking upon receipt of a given code and then automatically position the driver's seat and steering wheel to the respective attitudes in accordance with the code.

22 Claims, 40 Drawing Figures

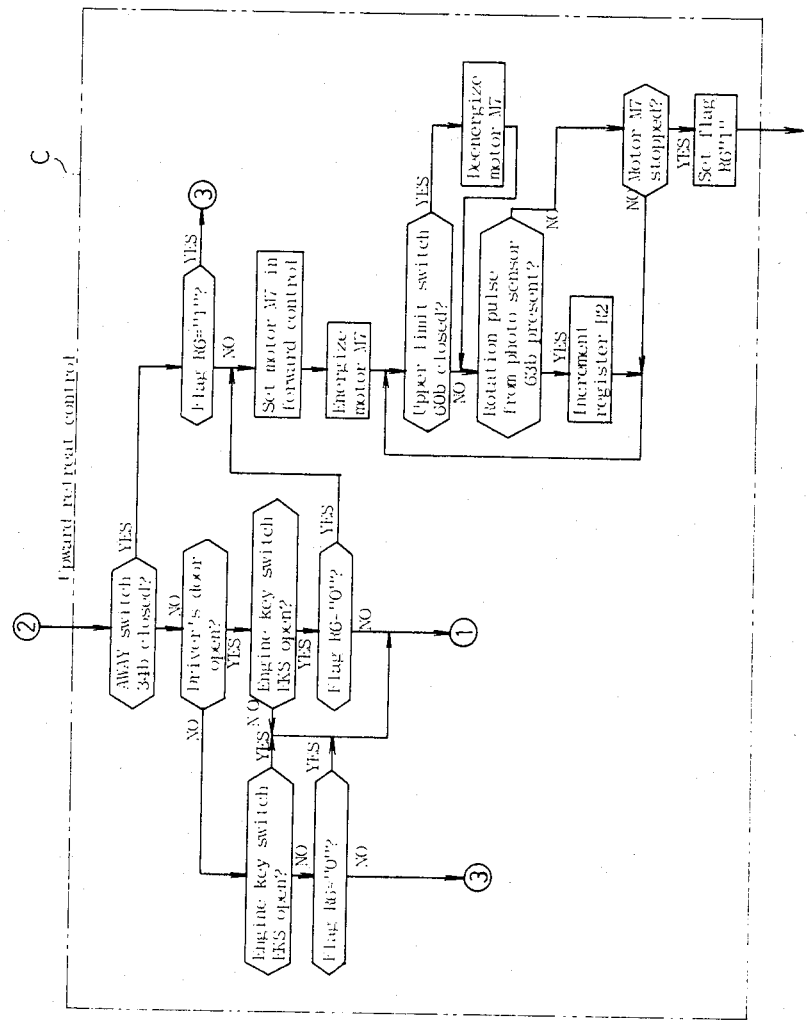

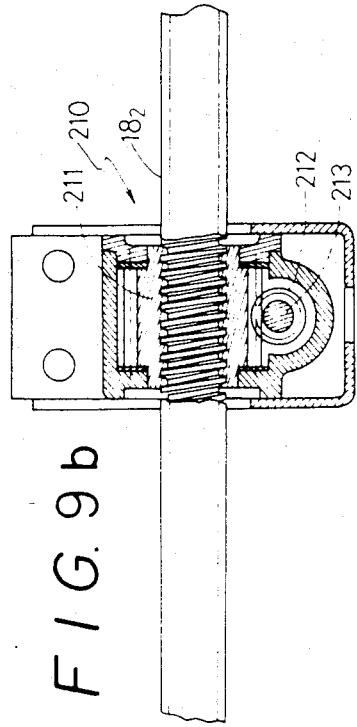
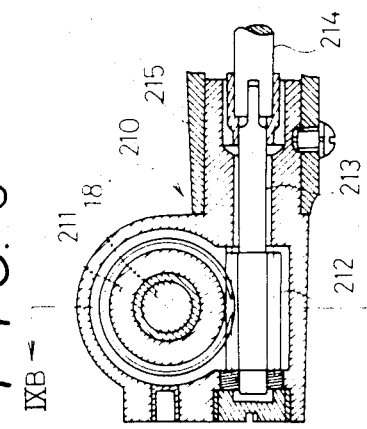
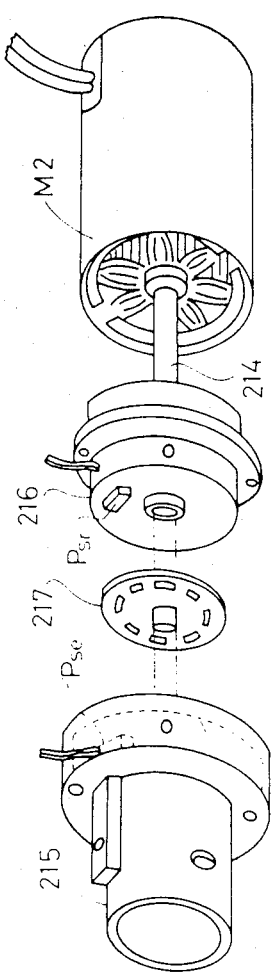
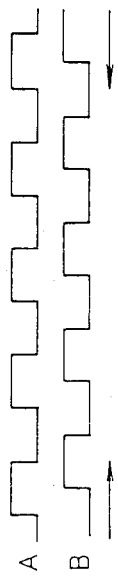
FIG.9a
FIG.9b
FIG.9c
FIG.9d

ATTITUDE CONTROLLING DEVICE FOR A STEERING WHEEL

BACKGROUND OF THE INVENTION

The invention relates to an on-vehicle attitude controlling device, and more particularly to an attitude controlling device for use in setting the attitude of a steering wheel.

In the field of automotive vehicles such as a passenger car, there are known tilt steering devices in which the inclination (or tilt angle in a vertical plane) of a steering wheel of a steering mechanism is electrically adjustable in an automatic manner and the steering wheel is tilted upon the actuation of a switch to fit the attitude of a driver. One of those tilt steering devices of this type is so constructed that the manipulation part can be retracted to a turned-up position (or tilt away position) exceeding a range of the normal driving attitude. In such a device, the steering wheel is retracted in response to the actuation of a retract instructing switch by the driver when he enters into or alights from the vehicle, thereby to facilitate the entering and alighting.

With the above tilt steering device such that the manipulation part of the steering mechanism is retracted to the tilt away position when the driver enters into or alights from the vehicle, the entering and alighting can be really facilitated, but it is required for the driver to actuate a switch attached on the manipulation part whenever he rides in the vehicle, thereby to return the steering wheel from its tilt away position to a driving position, and then adjust or reset the inclination of the steering wheel to a given position suitable for the driver. This adjustment is very troublesome so that the proper adjustment can not be effected in many cases.

There is also known such an attitude controlling device that is equipped with various electric control mechanisms on a driver's seat of the vehicle and makes it possible to allow the attitude of the driver's seat to accurately fit the driving attitude of the driver. However, even if the seat attitude is accurately set in position, this can not provide a valuable effect without accurate setting of the steering wheel attitude, because the latter attitude has a large influence on the driving attitude.

Moreover, the steering wheel of the vehicle is capable of being adjusted in its height, but the adjustment is usually carried out by pushing down or drawing up the steering wheel with a strong force. Therefore, it is practically impossible for the purpose of facilitating the entering and alighting to change a height of the steering wheel whenever the driver enters into or alights from the vehicle. In the case of using an automatic device that an electric elevating mechanism is coupled to the steering wheel and a height of the steering wheel is adjusted upon the actuation of a switch, the steering wheel can be automatically shifted from the retreated position allowing the easy entering and alighting to the driving position or vice versa whenever the driver enters into or alights from the vehicle. However, the manual switch operation is required for the vertical adjustment to properly reset the steering wheel from its retracted position to the driving position suitable for the driver. This adjustment is also relatively troublesome.

SUMMARY OF THE INVENTION

A first object of the invention is to facilitate the setting of a steering wheel to a retracted position or a driving position, a second object is to practically eliminate the need of adjusting a height of the steering wheel at each time of the riding, and a third object is to allow the steering wheel to be readily set to the attitude suitable for each of the respective drivers.

According to the invention, the foregoing objects are achieved in such a manner that attitude information of the steering wheel at the current time is stored in response to the actuation of a storage instructing switch means, the attitude information is held in an electronic control device, and the electronic control device functions to energize a steering wheel driving unit and then position the steering wheel to its retracted position in conjunction with at least either one of the opening of a door associated with a driver's seat and the opening of a power switch actuated by an engine key, preferably with both such opening operations at the same time, while the electronic control device also functions to energize the steering wheel driving unit and then position the steering wheel to its driving position determined by the stored data in conjunction with at least either one of the closing of the door associated with the driver's seat and the closing of the power switch actuated by the engine key, preferably with both such closing operations at the same time.

In general, drivers on the vehicles have to properly manipulate a steering wheel, accelerator pedal, brake pedal, transmission, switches or the like in accordance with the current state of roads, weather, road signs and other situations, but the manipulated parts of those members are fixed in position. To the contrary, the drivers have their own physical features largely different from one another. Accordingly, the driver's seat is made adjustable in its position along the horizontal and vertical directions, in its inclination and further in the strength of its cushioning corresponding to the specific feature of each driver. Now, in view of the possibility that the same car is driven by several persons in turn, and that the comfortable attitude is changed upon a degree of fatigue or a state of roads (such as a descending, ascending or curved road) even in the traveling of the car driven by one person, it is therefore preferable to make the attitude of the driver's seat adjustable depending on the then driver and the current state of roads. However, the manual adjustment is troublesome and the need of frequent adjustment at each time of riding on the vehicle also makes such a system troublesome. From this circumstance, there is recently proposed an attitude adjusting device in which a microcomputer is equipped on the vehicle to receive data indicative of the physical feature of the driver, the corresponding seat attitude setting data is calculated by the microcomputer, and then the driver controls a position adjusting device while reading the attitude data. Such a device for memorizing and setting the attitude is also proposed that the attitude adjusting device includes a position sensor and a manual attitude adjusting device, after adjusting the seat attitude by the latter device setting data (or data from the position sensor) is memorized in the microcomputer under the correspondence to an identification code, and after once memorized the seat attitude can be automatically set in accordance with the setting data by inpūtting the identification code to the microcomputer. In addition, the applicant has proposed (as U.S. patent application Ser. No. 235,173 now U.S. Pat. No. 4,404,632 which is assigned to the same assignee as the present application) a driver's seat in which attitude setting standard data corresponding to the physical features of the drivers is beforehand stored in a semiconductor memory unit, data indicative of the physical feature of the then driver is input to the microcomputer to read the corresponding seat attitude setting standard data and then automatically establish a certain seat attitude, the seat attitude is adjustable by the manual switch and/or key operation, each of seat attitude setting data is stored in a non-volatile semiconductor memory unit under the correspondence to an identification code, and in response to input of the identification code the corresponding seat attitude setting data stored in the non-volatile semiconductor memory unit is read out to automatically set the desired seat attitude. Furthermore, there has been also proposed a device capable of similarly adjusting and setting the attitude of mirrors by the key operation (refer to U.S. patent application Ser. No. 268,526 now U.S. Pat. No. 4,451,887 which is assigned to the same assignee as the present application).

In a preferred embodiment of the invention, the attitude of the steering wheel is controlled in accordance with the characteristics of a specific driver in the same manner as an attitude control of the driver's seat and mirrors.

Other objects and features of the invention will become more apparent from a reading of the following description with reference to the drawings.

BRIEF DESCRIPTION OF THE DRAWINGS

FIGS. 4d, 4e and 4f are flow charts showing a part of the control operation of an electronic control device in accordance with another embodiment of the invention;

FIG. 9a is a sectional view of a nut unit 210 shown in FIG. 8, taken along the direction perpendicular to a threaded bolt $18_2$;

FIG. 9b is a sectional view taken along the line IXb—IXb in FIG. 9a;

FIG. 9c is an enlarged perspective view of the coupling portion between a motor M2 and a nut unit 210;

FIG. 9d is a waveform illustration showing output signals from a phototransistor unit Psr shown in FIG. 9c;

FIGS. 17a, 17b, 17c, 17d, 17e, 17f and 17g are flow charts showing the operation of a microcomputer incorporated in the keyboard 13.

DESCRIPTION OF PREFERRED EMBODIMENTS

Figure 1A:
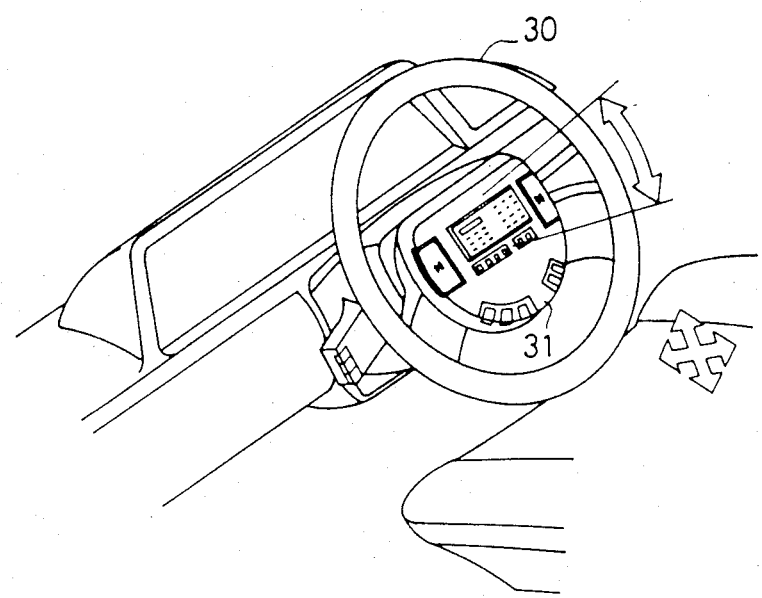
FIG. 1a is a perspective view of a manipulation part and its surroundings of a steering mechanism in accordance with an embodiment of the invention.
Figure 1B:
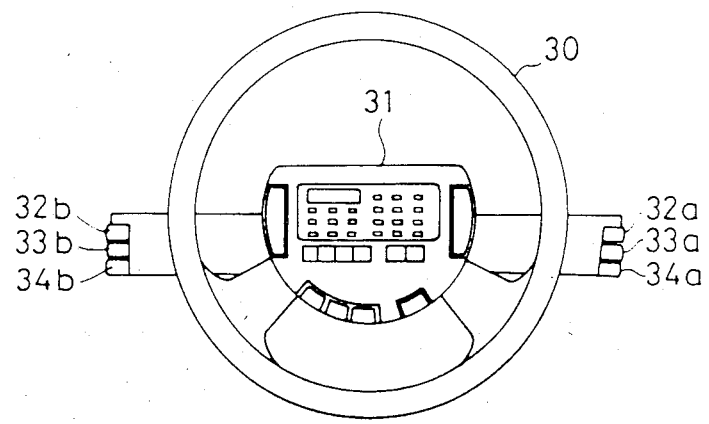
FIG. 1b is a front view showing a steering wheel and a control panel.

FIGS. 1a and 1b show a steering wheel of a vehicle and its surroundings in accordance with an embodiment of the invention. Referring to FIGS. 1a and 1b, a control panel 31 for an attitude controlling device is attached to the center of a steering wheel 30. Three switches 32a, 33a and 34a locating on the right side of the steering wheel 30 are used for controlling a tilt angle. The numeral 32a denotes an UP switch for tilting the steering wheel 30 upward to correct its inclination (or tilt angle), the numeral 33a denotes a DOWN switch for tilting the steering wheel 30 downward to correct its inclination, and the numeral 34a denotes an AWAY switch for setting the inclination of the steering wheel to a tilt away (upper limit retracted) position or for returning the steering wheel from the tilt away position to the original driving position.

Three switches 32b, 33b and 34b locating on the left side of the steering wheel 30 are used for controlling a height of the steering wheel. The numeral 32b denotes an UP switch for allowing the upward movement, the numeral 33b denotes a DOWN switch for allowing the down ward movement, and the numeral 34b denotes an AWAY switch for allowing the steering wheel to be elevated to a height away (upper limit retracted) position or returned to the driving position when it locates at the height away position.

Figure 2A:
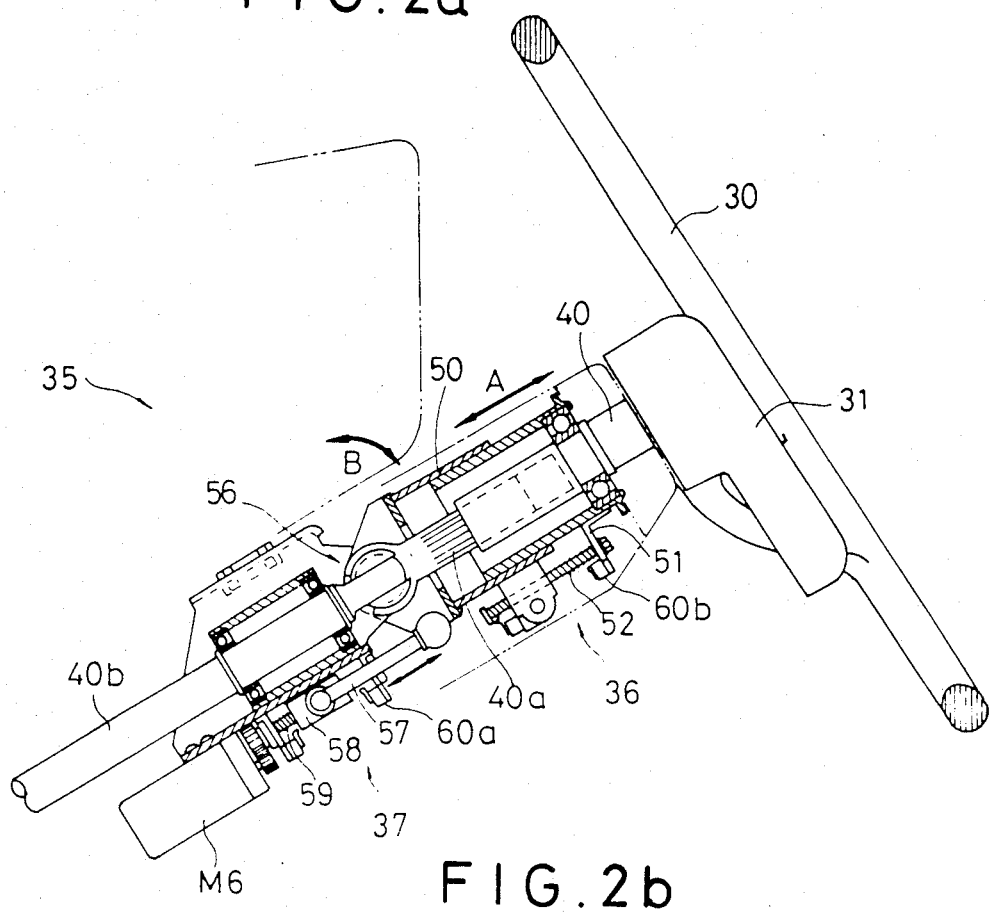
FIG. 2a is a side sectional view of a control section of the steering mechanism.
Figure 2B:
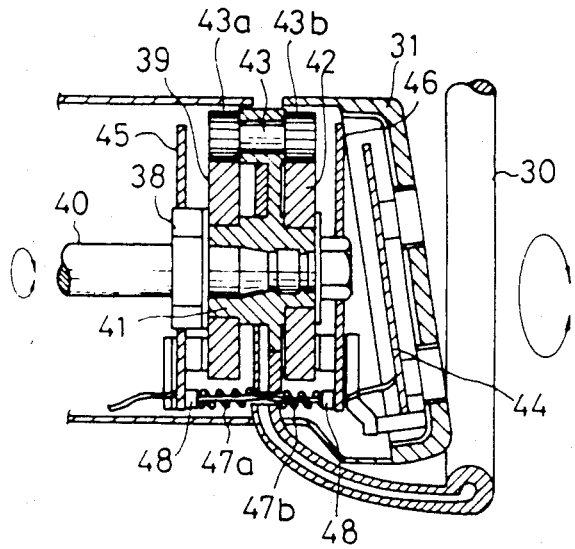
FIG. 2b is a sectional view showing a support structure for the steering wheel and the control panel.

FIG. 2a is a side view of a control section 35 of a steering mechanism. The control section 35 is roughly divided into the steering wheel 30, control panel 31, steering shaft telescoping mechanism 36 and a tilting mechanism 37. FIG. 2b is a sectional view showing a support structure for the steering wheel 30 and the control panel 31. A support 38 and a toothed wheel 39 are fixedly attached to a vehicle body, while a steering main shaft 40 is rotatably retained by the support 38. A support 41 is coupled to the steering wheel 30 and the steering main shaft 40 while rotatably supporting the toothed wheels 39, 42 and a connecting member 43. The connecting member 43 includes at both ends thereof toothed wheels 43a, 43b having the same number of teeth as the toothed wheels 39, 42 and in mesh therewith, respectively. The control panel 31 and a printed circuit board 44 including an attitude control circuit are fixedly mounted to the toothed wheel 42. Slip rings 45, 46 are fixedly mounted to the support 38 and the control panel 31, respectively, while brushes 48 are pressed against the slip rings 45, 46 by the action of compressed coil springs 47a, 47b, thereby to electrically conduct between the slip rings 45 and 46. Besides, the toothed wheels 39, 42 have the number of teeth equal to each other.

The above stated construction aims to prevent the control panel 31 from turning together with rotation of the steering wheel 30. In this embodiment, when the steering wheel 30 is rotated, the support 41 and the steering main shaft 40 are turned for the steering operation. On this occasion, since the toothed wheels 43a, 43b have the same number of teeth as the toothed wheels 39, 42, respectively, an arc-shaped movement of the connecting member 43 due to the turning of the support 41 produces relative movements not only between the support 41 and the toothed gear 39 but also between the support 41 and the toothed gear 39. But the extents (or angles) of such relative movements are equal to each other. As a result, the toothed wheel 42 is not rotated with respect to the toothed wheel 39 and hence, the rotation of the steering wheel 30 will not cause the control panel 31 to be turned. The power is fed to the printed circuit board through the slip rings 45, 46 and the brushes 48.

Figure 2C:
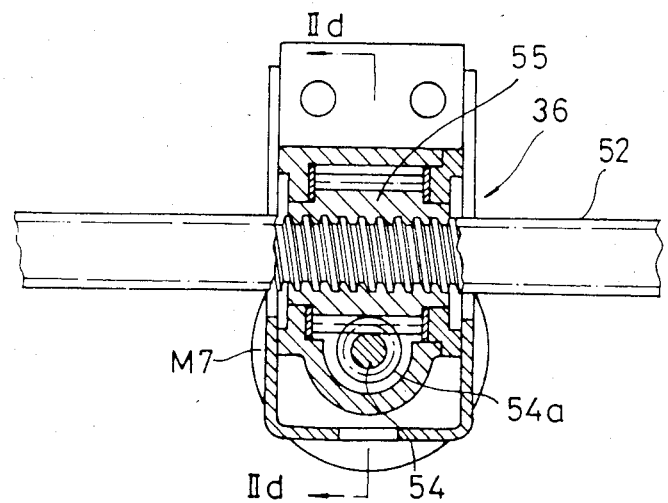
FIG. 2c is an enlarged sectional view showing the driving section of a steering shaft telescoping mechanism 36.
Figure 2D:
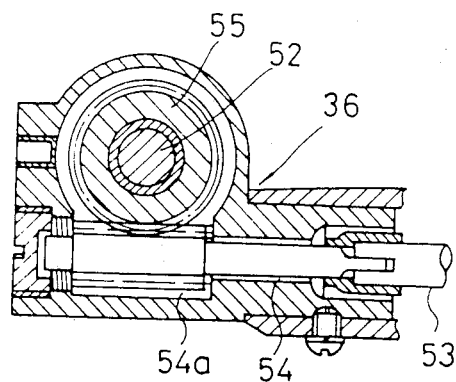
FIG. 2d is a sectional view taken along the line IId—IId in FIG. 2c.

FIG. 2c is an enlarged sectional view of a driving section of the steering shaft telescoping mechanism 36, and FIG. 2d is a sectional view taken along the line IId—IId in FIG. 2c. The steering shaft telescoping mechanism 36 functions to move the steering wheel 30 forward or backward relative to the driver and is driven by a motor M7 in this embodiment. The main shaft 40 is fitted to a shaft 40a slidably not in the rotational direction but in the axial direction indicated by an arrow A. A guide member 50 on the fixed side mounts thereon the driving section including the motor M7, which 50 drives a threaded bolt 52 fixedly attached to a bracket 51 on the movable side. A shaft 53 of the motor M7 is coupled to a worm shaft 54, while a worm gear 54a formed on the worm shaft 54 is meshed with the threaded outer peripheral surface of a nut 55. The nut 55 is engaged with the threaded bolt 52 and rotatable at a fixed position, so that upon the rotation of the motor M7 the worm gear 54a is turned and this causes the nut 55 to rotate and then the threaded bolt 52 to move forward (or backward) in the axial direction indicated by the arrow A. Consequently, the movable parts including the steering wheel 30 are moved forward or backward in the axial direction of the main shaft 40, i.e. in the direction indicated by the arrow A, while being guided by the guide member 50. Upon this, the steering wheel 30 is elevated or lowered.

Figure 2E:
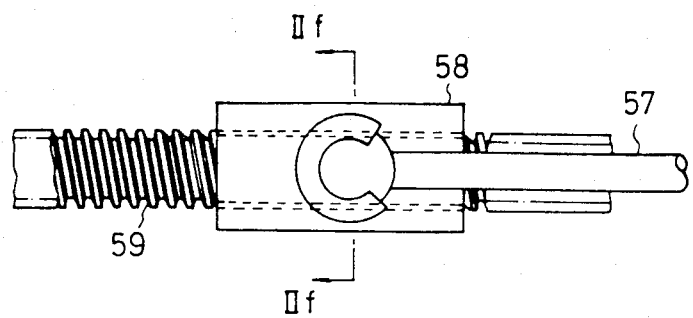
FIG. 2e is an enlarged view showing essential parts of a driving section of a tilting mechanism 37.
Figure 2F:
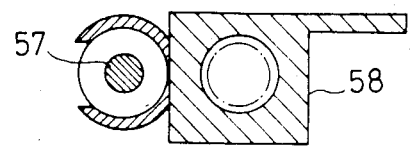
FIG. 2f is a sectional view taken along the line IIf—IIf in FIG. 2e.

FIG. 2e is an enlarged view showing essential parts of a driving section of the tilting mechanism 37, and FIG. 2f is a sectional view taken along the line of IIf—IIf in FIG. 2e. A shaft 40b is rotatable at a fixed position and the shaft 40a is coupled to the shaft 40b through a universal joint 56 so as to be adjustable in its inclination (or tilt angle) in the direction indicated by an arrow B. The reference numeral 57 denotes an arm having one end which is connected to the fixed part of the telescoping mechanism 36 at a position apart downward from the universal joint 56 serving as a fulcrum for the tilting motion and the other end which is connected to a nut 58 on the driving side. The nut 58 is in mesh with the threaded bolt 59 which is driven for rotation by a motor M6. Therefore, a rotation of the motor M6 allows the threaded bolt 59 to turn but causes the nut 58 not to turn, so that the nut 58 is moved in the axial direction (i.e. the direction indicated by the arrow A) and then the arm 57 is driven to turn the movable parts in the tilting mechanism about the universal joint 56. The reference numerals 60a, 60b in FIG. 2a denote limit switches used for detecting upper limit positions of the movable parts in the tilting mechanism and the telescoping mechanism, respectively.

Figure 2G:
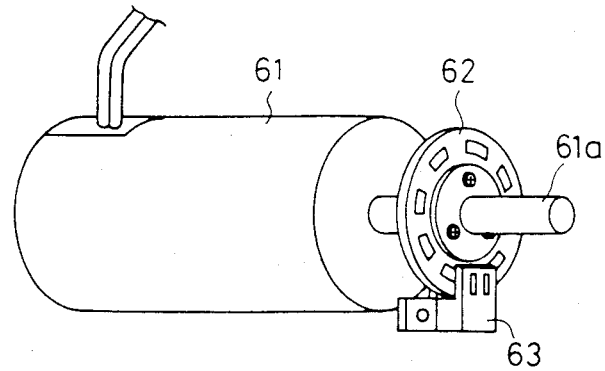
FIG. 2g is a perspective view of a motor (M6, M7) and a sensor for detecting rotations of the motor and generating pulses.

FIG. 2g shows a typical example of a motor used as the motors M6, M7. A motor body 61 is of a direct current motor and has a shaft 61a mounting thereon a disc 62 which is formed on its peripheral portion with a plurality of openings with an equal interval therebetween. There is disposed a photosensor 63 comprising a pair of a light emitting diode and a photodiode facing each other with the disc 62 between.

Figure 3:
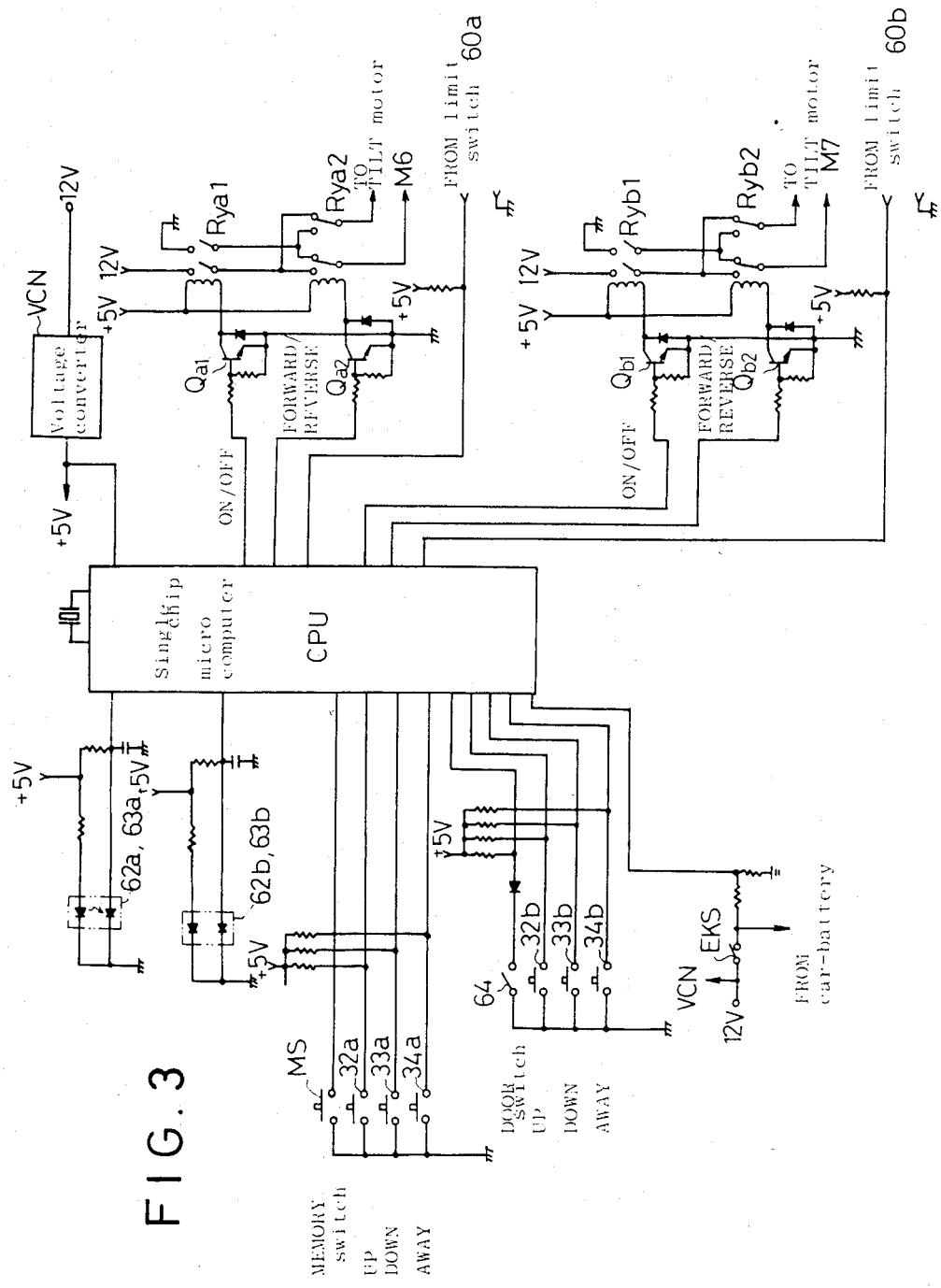
FIG. 3 is a circuit diagram showing a typical example of a control circuit for the motor M6.

FIG. 3 shows one embodiment of a circuit in which a single chip microcomputer CPU is used to constitute an electronic control device for the telescoping mechanism 36 and the tilting mechanism 37. To input ports of the CPU connected are a memory switch MS adapted to instruct the storing of attitude information, photosensors 63a, 63b for detecting the rotations of the motors M6, M7, door switch 64 turned on or off in response to the opening or closing of the door, UP switches 32a, 32b, DOWN switches 33a, 33b, AWAY switches 34a, 34b, power switch EKS actuated by an engine key, and the limit switches 60a, 60b. On the other hand, transistors $Q_{a1}$, $Q_{b1}$ and $Q_{a2}$, $Q_{b2}$ are connected to output ports of the CPU. The transistors $Q_{a1}$, $Q_{b1}$ function to drive relays $R_{ya1}$, $R_{yb1}$, thereby to energize or deenergize the motors M6, M7, while the transistors $Q_{a2}$, $Q_{b2}$ function to drive relays $R_{ya2}$, $R_{yb2}$, thereby to turn over the polarity of power fed to the motors M6, M7.

Figure 4A:
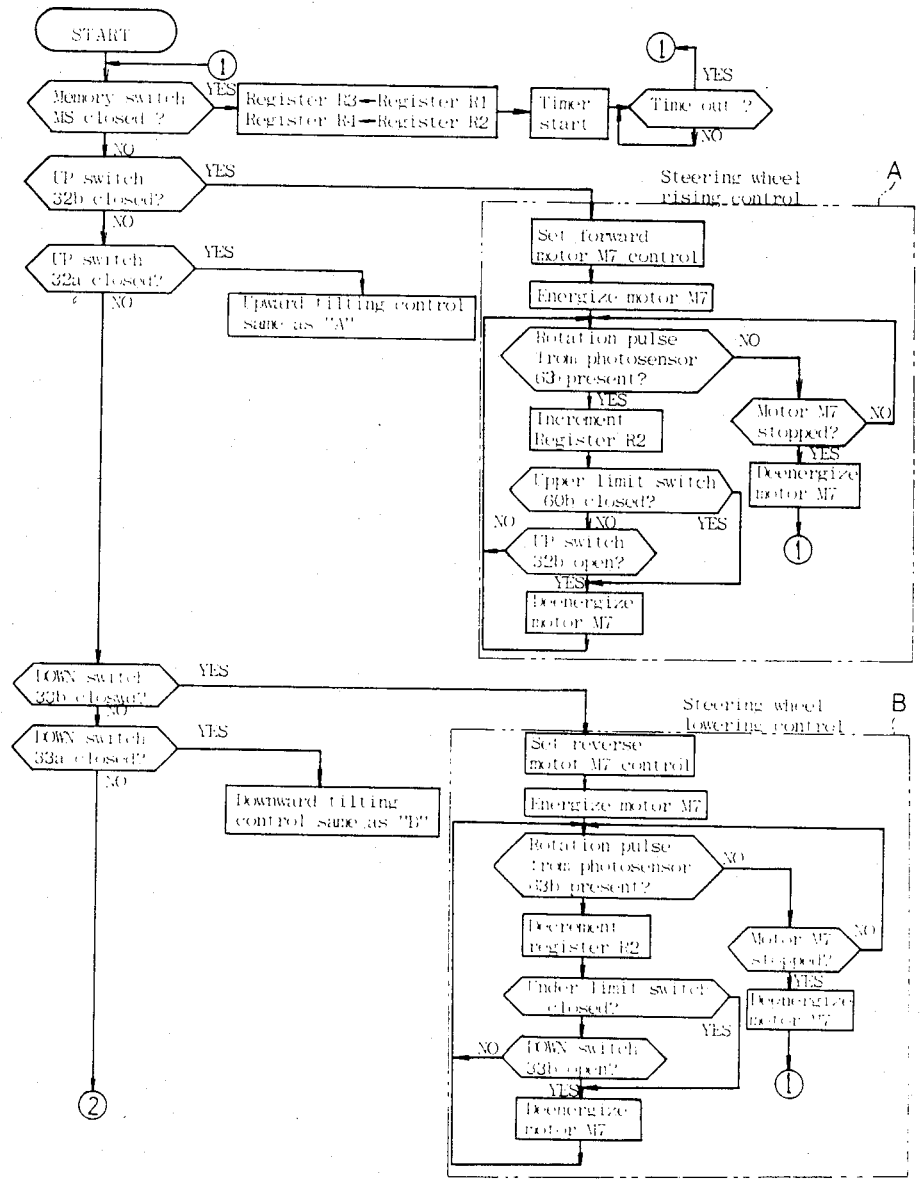
FIGS. 4a, 4b and 4c are flow charts for the control circuit shown in FIG. 3.
Figure 4B:
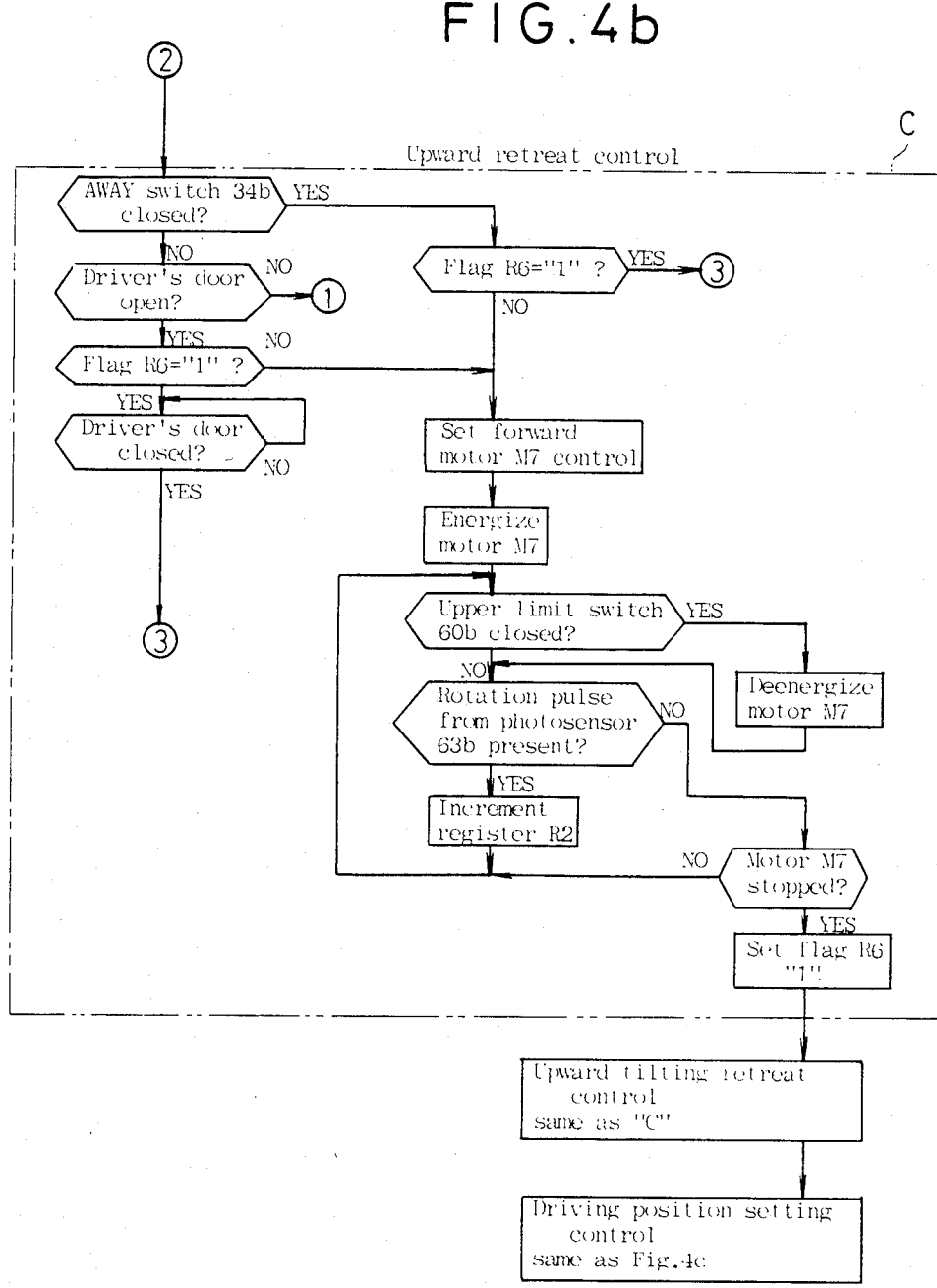
Figure 4C:
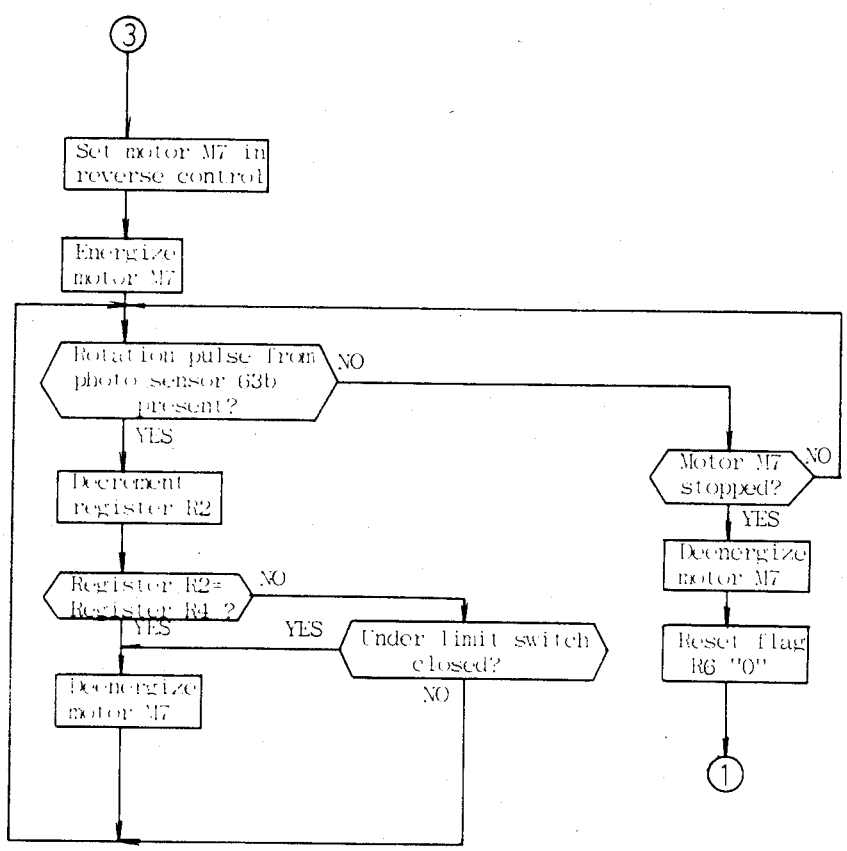

The manner of control operation of the electronic control device, namely the microcomputer CPU in this embodiment, will be described hereinafter by referring to flow charts shown in FIGS. 4a, 4b and 4c. Major registers employed for the operation flow and their functions are summarized in the following table 1.

TABLE 1

| Registers | Functions | Remarks |
| --- | --- | --- |
| Tilt count register R1 | Tilt angle data count | Count up with program |
| Height count register R2 | Height data count | Count up with program |
| Permanent memory register R3 | Tilt angle data (Driving position) memory | |
| Permanent memory register R4 | Height data (Driving position) memory | |
| AWAY flag R5 | Status memory | "1" at tilt away position |
| AWAY flag R6 | Status memory | "1" at height away position |

As the attitude control operation for the steering mechanism, the steering shaft telescoping mechanism is actuated to control a height of the steering wheel in any one of such cases as (i) the door associated with the driver's seat is opened (retraction control), (ii) the door associated with the driver's seat is closed (return control to the driving position), (iii) the UP switch $32b$ is depressed (elevating control), (iv) the DOWN switch $33b$ is depressed (lowering control), and (v) the AWAY switch $34b$ is depressed (return control to the driving position with R6="1", retraction control with R6="0"). The steering wheel tilting mechanism is actuated to control the inclination of the steering wheel in any one of the corresponding five cases. Since the manner of control operation for the telescoping mechanism is similar to that for the tilting mechanism, there will be described the manner of control operation for the former mechanism by referring the flow charts shown in FIGS. 4a, 4b and 4c.

Firstly, in the case of (i) (refer to FIG. 4b), the CPU checks whether an AWAY flag is "1" or "0". The AWAY flag of "1" means that the telescoping mechanism for the steering wheel is at its away position (or upper limit position), so it will waits for the closing of the door (or completion of entering) and then the operation proceeds to ③. Upon this, the transistor $Q_{b2}$ and the relay $R_{yb1}$ are turned on to set the polarity of the motor M7 in reverse rotation. Then, the transistor $Q_{b1}$ and the relay $R_{yb2}$ are turned on to feed (or energize) the motor M7 through a contact of the relay $R_{yb2}$. The disc $62b$ is rotated together with a rotation of the motor M7, so that the photodiode incorporated in the photosensor $63b$ is turned on or off repeatedly and generates pulses in numbers proportional to an amount of rotation of the motor M7. For each arrival of thus generated pulse, the CPU decrements the counter (register R2) and compares the content of the register R2 with that of the register R4. The motor M7 is held in an energized state until the contents of both registers become equal to each other, so that the steering mechanism is returned from the away position to the original driving position and hence, the AWAY flag R6 is reset to "0". On the other hand, when the AWAY flag R6 assumes "0" as a result of a check by the CPU, this means that the steering mechanism is at the driving position. Therefore, the presence of such AWAY flag R6 is judged as a retraction instruction at the time of alighting and the operation will be proceeded as follows. The CPU sets the motor M7 in forward rotation and increments the counter (register R2) for each arrival of a pulse from the photosensor $63b$. The motor M7 is continued to be driven until the limit switch $60b$ at an upper limit position will be turned on, and then the AWAY flag R6 is set to "1" after the motor M7 has stopped.

When the UP switch $32b$ is depressed, the CPU sets the polarity of the motor M7 in forward rotation and starts to feed the motor M7. Thus, the motor M7 is continued to be driven until the UP switch $32b$ will be released from its depressed state, while incrementing the counter (register R2) for each arrival of a pulse from the photosensor $63b$.

When the DOWN switch $33b$ is depressed, the CPU checks first whether the AWAY flag R6 is "1" or "0". In the case that the AWAY flag assumes "1" (i.e. the steering mechanism is at the away position), the motor M7 is rotated in the reverse direction so as to return the steering mechanism to the original driving position. In the case that the AWAY flag R6 assumes "0", the CPU sets the polarity of the motor M7 in reverse rotation and starts to feed the motor M7. Thus, the motor M7 is continued to be driven until the DOWN switch $33b$ will be released from its depressed state, while decrementing the counter (register R2) for each arrival of a pulse from the photosensor $63b$.

When the AWAY switch $34b$ is depressed, the CPU checks whether the AWAY flag R6 is "1" or "0". With the AWAY flag R6 assuming "1", the motor M7 is rotated in the reverse direction so as to return the steering mechanism to the original driving position. With the AWAY flag R6 assuming "0", the CPU causes the motor M7 to rotate in the forward direction until the limit switch $60b$ at an upper limit position will be turned on, while incrementing the counter (register R2) for each arrival of a rotation pulse. Then, the AWAY flag R6 is set to "1" after the moror M7 has stopped.

In the case that the driver actuates the UP switch $32b$ and/or the DOWN switch $33b$ to set the steering wheel at a desired attitude, the content of the register R2 represents the attitutde at that time. Now, if the memory switch MS is closed, the content of the register R2 is written into the register R4 at the beginning of a flow shown in FIG. 4a, which content will be held in the register R4 until it receives again new input. As mentioned above, an attitude control for returning to the driving attitude is performed with the content of the register R4 being used as a standard value. Therefore, once the memory switch MS is closed, the subsequent control operation makes the steering wheel set at the same attitude as when the memory switch MS has been closed, at every time the steering wheel is returned from the away position to the driving position. In this manner, the steering wheel can be readjusted as required, but it is not necessary to perform such readjustment in practice.

Figure 5:
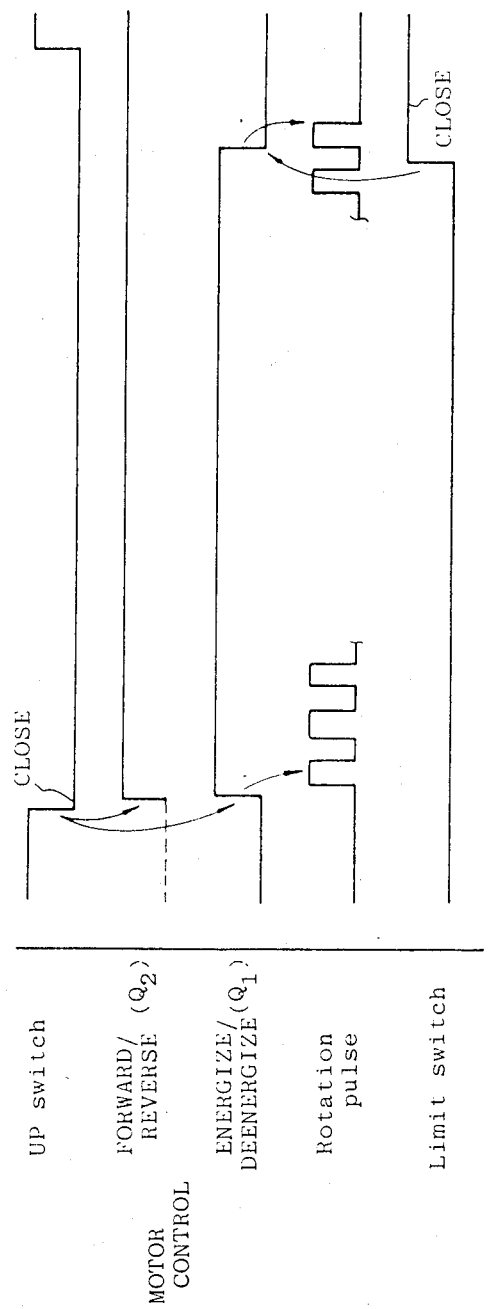
FIG. 5 is a timing chart showing a state of each signal in the control circuit when an UP switch 32 is depressed.

FIG. 5 shows an example of an timing chart when the UP switch $32b$ is depressed.

The above description has been directed to only the upward and downward telescoping control of the steering mechanism, but tilting mechanism also is able to carry out the similar positioning control of the steering wheel attitude through a driving circuit for the motor M6 by storing and regenerating the information thereof.

Figure 4D:
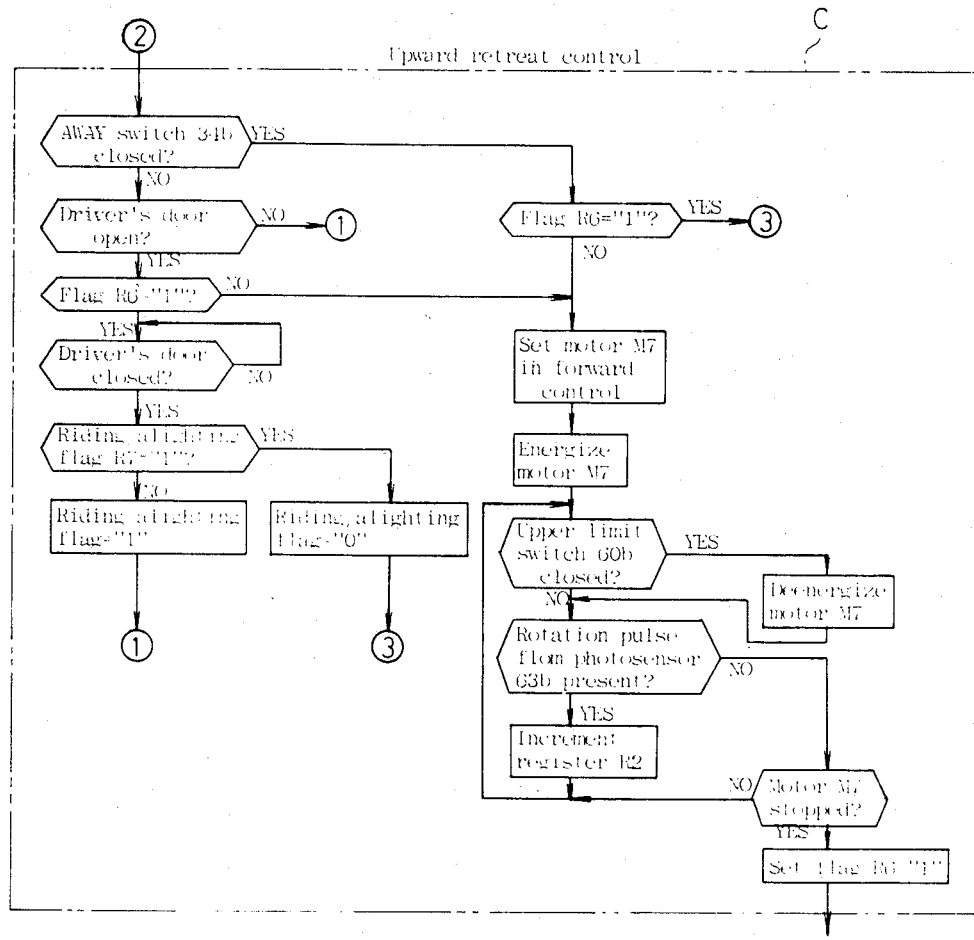
Figure 4E:
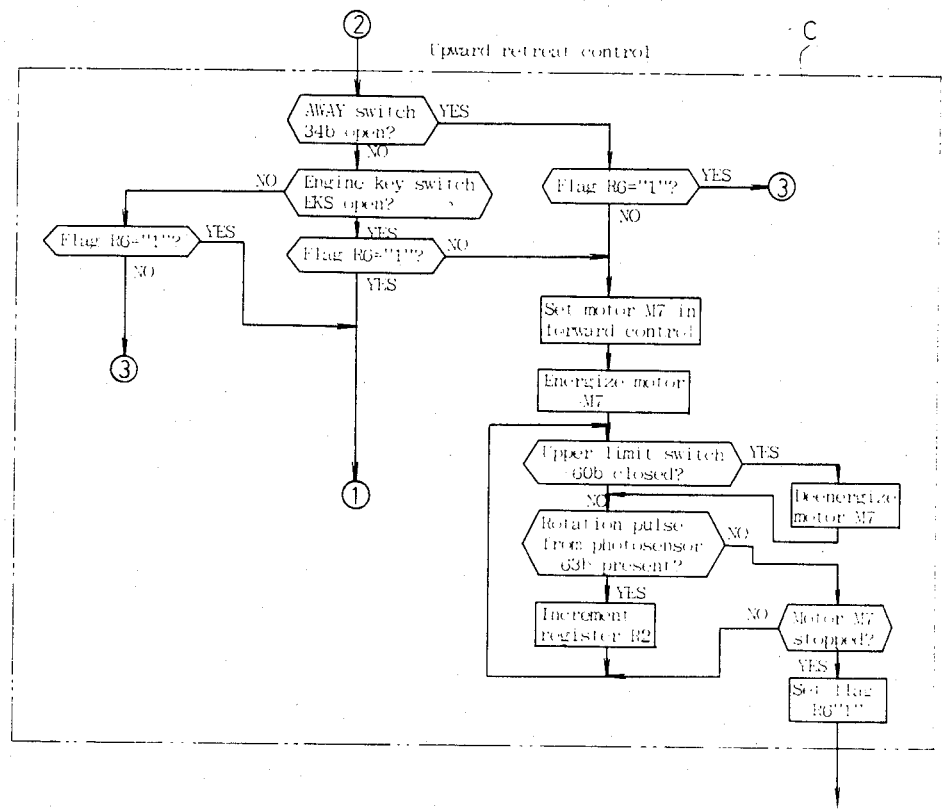

In the foregoing embodiment, the return operation from the away position to the driving position is started after confirming by checking the AWAY flag that the steering mechanism is at the away position, and then after waiting for that the door will be closed. However, if another flag is added to check the riding and alighting of the driver, it becomes possible to minimize the extent of operation required for the retreating mechanism. For example, let it be assumed that the additional flag is represented by a entering/alighting flag and this flag R7 changes its state in response to the opening or closing of the door. After the retreat operation at the time of alighting, a state of the entering/alighting flag R7 is checked. On this occasion, the flag R7 assumes "0" so that the return operation is not effected, and then the entering/alighting flag R7 is set to "1". When the door is opened at the time of entering, the entering/alighting flag R7 assumes "1" so that the telescoping mechanism is not operated. With the door being closed after the driver enters the vehicle, a state of the entering/alighting flag R7 is checked. At this time, the flag R7 assumes "1" so that the return operation is performed, and then the entering/alighting flag R7 is reset to "0". By so doing, it becomes possible to eliminate the useless need of the return operation when the door is closed subsequent to the alighting and the retreat operation when the door is opened at the time of entering (because the steering mechanism locates in the away position at the time of riding). As a result, the power dissipation of a battery is reduced by half. Stated differently, either the retraction operation or the return operation is carried out for each two closing or opening operations of the door in this embodiment. A control flow for such a case is shown in FIG. 4d. The flow of FIG. 4d is employed in place of a section C in FIG. 4b.

Moreover, although in the foregoing embodiment the steering wheel is set to the away position or the driving position in response to the opening or closing of the door associated with the driver's seat, the attitude of the steering wheel is controlled in response to the opening or closing of the power switch EKS which is actuated by an engine key, according to still another embodiment of the invention. More specifically, when the power switch EKS is changed over from a closed state to an open state, this is assumed to mean that the driver will alight from the vehicle, so that the steering wheel is retreated to the away position. On the other hand, when the power switch EKS is changed over from an open state to a closed state, this is assumed to mean that the driver has entered and will start the vehicle, so that the steering wheel is returned from the away position to the driving position. This embodiment has the similar arrangement to that as described above in detail, but a flow of the CPU operation is modified from the section C in FIG. 4b to FIG. 4e.

Still another embodiment of the invention is arranged as follows. When the door associated with the driver's seat is closed and the power switch EKS is closed at the same time, this is assumed to mean that the driver has entered and will start the vehicle, so that the steering wheel is returned from the away position to the driving position. On the other hand, when the door associated with the driver's seat is opened and the power switch EKS is opened at the same time, this is assumed to mean that the driver will alight from the vehicle, so that the steering wheel is retreated from the driving position to the away position. This embodiment has the similar arrangement to that as mentioned above in detail, but a flow of the CPU operation is modified from the section C in FIG. 4b to FIG. 4f.

In any of the foregoing embodiments, in accordance with the manipulation made by the driver when he rides on or alights from the vehicle, the steering wheel is automatically retracted to the away position at the time of alighting, while it is automatically returned to the preset driving position after the driver enters the vehicle and takes a seat in place. This makes it possible to eliminate the need of adjusting the inclination of the steering wheel at each time of entering.

There will be now described still another embodiment of the invention, in which the attitudes of the driver's seat and mirrors are controlled in combination.

Figure 6:
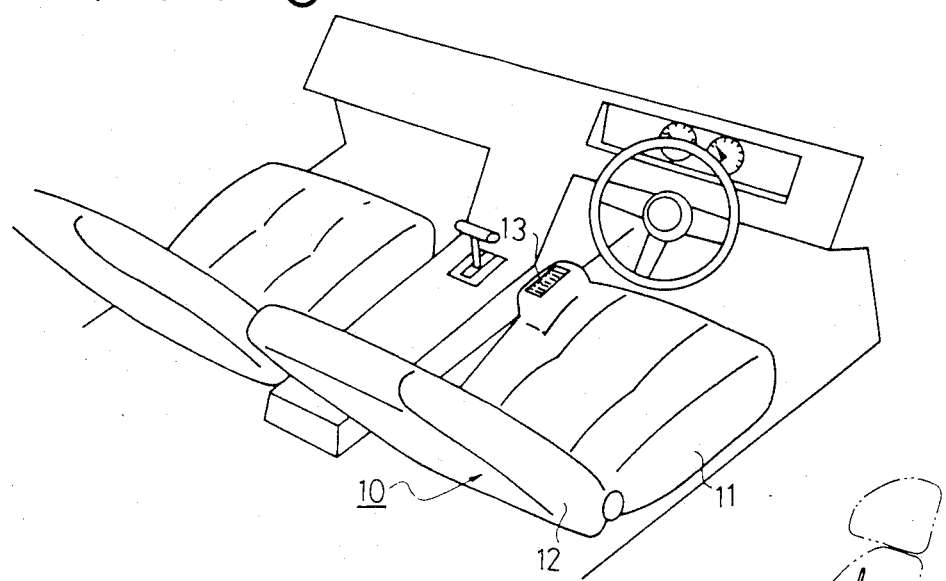
FIG. 6 is a perspective view showing the external appearance of a seat section in accordance with an embodiment of the invention.
Figure 7:
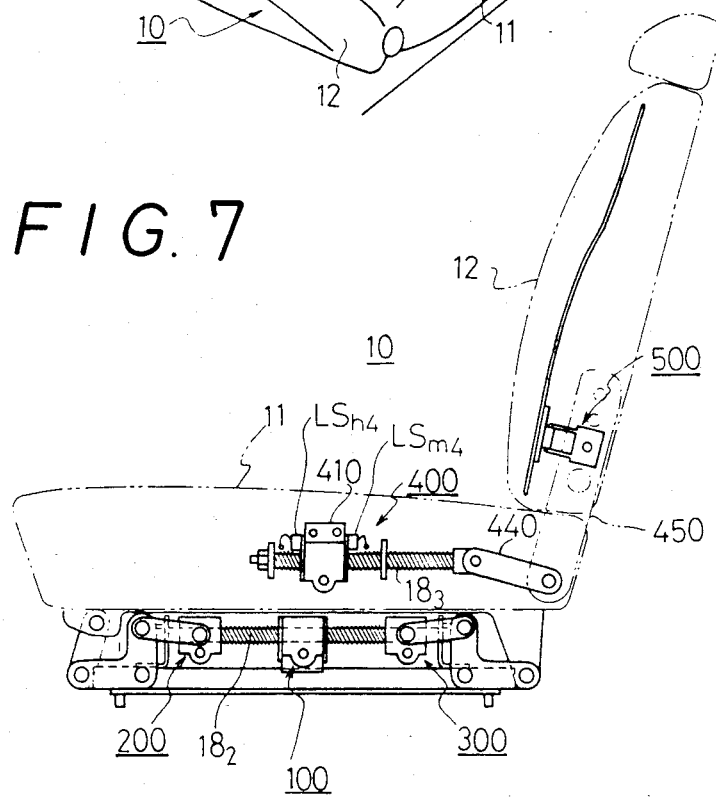
FIG. 7 is a schematic side view showing an attitude setting mechanism equipped on a driver's seat.

Referring to FIG. 6 which shows the appearance of driver's seat of one embodiment of the invention in perspective view, a driver's seat 10 is formed by a seat body 11 and a seat back 12 which is angularly movable with respect thereto. An operating board 13 is fixedly mounted on the seat body 11. An attitude controlling mechanism which is mounted on the seat body 11 and the seat back 12 is schematically illustrated in FIG. 7. In the example shown, the attitude controlling mechanism includes a seat forward/reverse drive mechanism 100 which causes a seat base supporting the seat body 11 to slide in the forward or reverse direction with respect to a base frame which is fixedly mounted on the floor of a vehicle, a seat front elevation adjusting mechanism 200 which elevates or lowers the front of the seat base, a seat rear elevation adjusting mechanism 300, a seat back tilting mechanism 400 pivotally mounted on the seat base for adjusting the angle of inclination of the seat back with respect to the frame, and a seat back cushion adjusting mechanism 500 which adjusts the spring cushion contained in the seat back. The combination of the seat front and the seat rear elevation adjusting mechanism 200, 300 determines the inclination of the seat body 11, and thus defines a seat base tilting mechanism.

Figure 8:
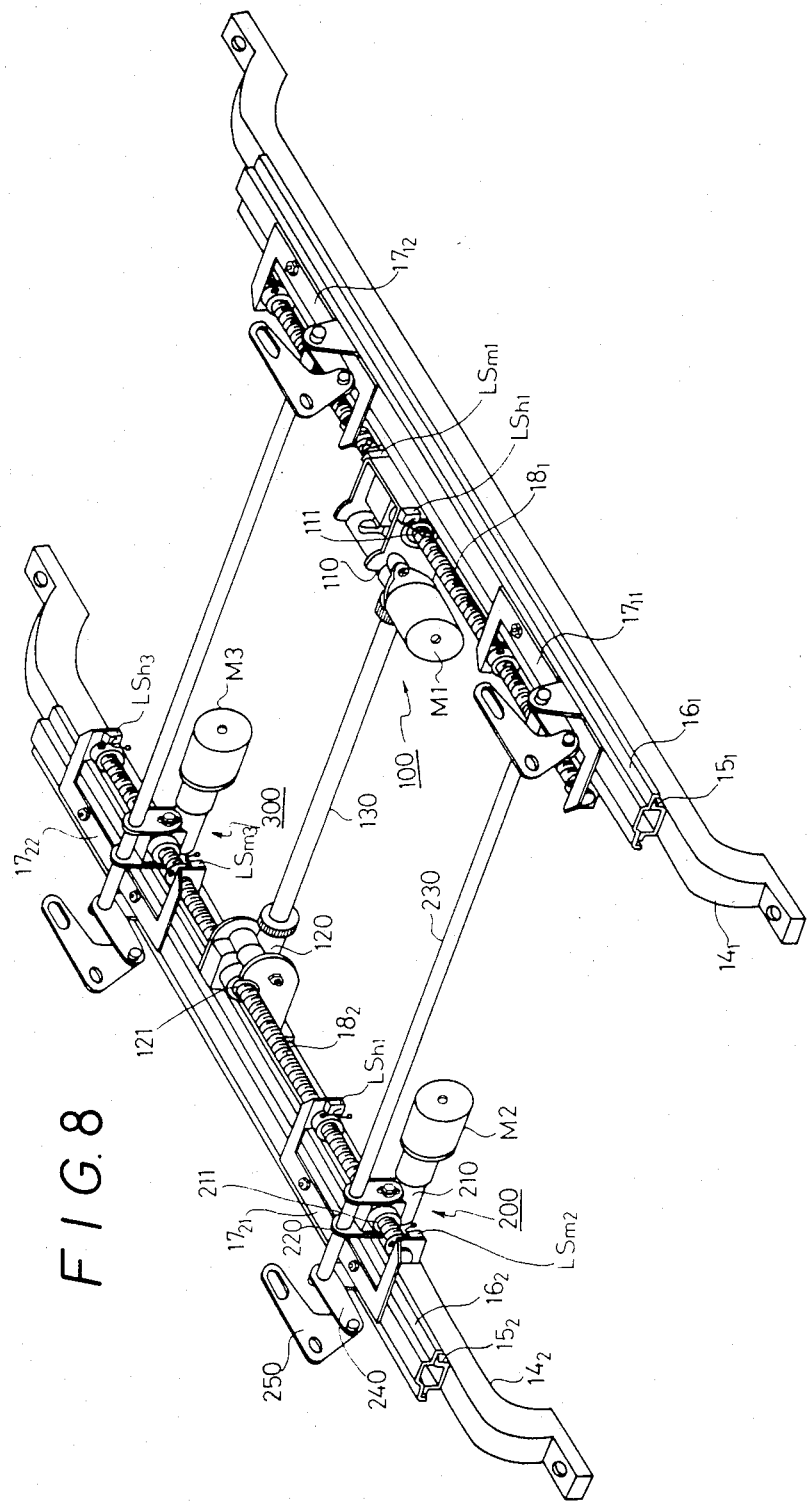
FIG. 8 is a detailed schematic view showing the mechanism incorporated under a seat base.

The mechanism located below the seat base which supports the seat body 11 is shown in FIG. 8. In this Figure, a pair of base frames $14_1$, $14_2$ are secured to the floor of the vehicle, and a pair of lower rails $15_1$, $15_2$ are fixedly mounted thereon. A pair of upper rails $16_1$, $16_2$ slidably rest on the lower rails $15_1$, $15_2$, respectively. A pair of arms $17_{11}$, $17_{12}$ are fixedly mounted on the upper rail $16_1$ while a pair of arms $17_{21}$, $17_{22}$ are fixedly mounted on the upper rail $16_2$. The arms $17_{11}$, $17_{12}$ fixedly carry a threaded bolt $18_1$ while the arms $17_{21}$, $17_{22}$ fixedly carry another threaded bolt $18_2$.

The threaded bolts $18_1$, $18_2$ threadably engage nut units 110, 120, respectively, which are fixedly mounted on the base frames $14_1$, $14_2$, respectively. The both nut units 110, 120 constitute together the seat forward/reverse drive mechanism 100, and includes a pair of nuts 111, 121 each having a threaded bore formed therein which is engaged by an associated one of the threaded bolts $18_1$, $18_2$, and having teeth formed around its outer periphery, and worm gears meshing with the nuts 111, 121, respectively. These worm gears are coupled together by a flexible shaft 130. In the unit 110, a bevel gear is fixedly mounted on the shaft on which the worm gear is mounted and meshes with another bevel gear which is fixedly mounted on the shaft of a motor M1. Since these units 110, 120 are secured to the respective base frames $14_1$, $14_2$, it will be seen that when the motor M1 is energized for rotation, the inner shaft of the flexible shaft 130 rotates to cause a rotation of the worm gear, thus rotating the meshing nuts 111, 121 which in turn forward the threaded bolts $18_1$, $18_2$, respectively. Since the threaded bolts $18_1$, $18_2$ are secured to the upper rails $16_1$, $16_2$ through the arms $17_{11}$, $17_{12}$, $17_{21}$ and $17_{22}$, a movement of the upper rails $16_1$, $16_2$ occurs. In this manner, the rotation of the motor M1 in the forward or reverse direction causes a sliding movement of the upper rails $16_1$, $16_2$ either forwardly or reversely with respect to the lower rails $15_1$, $15_2$.

The seat front elevation adjusting mechanism 200 includes a nut unit 210 constructed in the same manner as the unit 120, a motor M2, a rocking arm 220, a rod 230 integrally secured to the arm 220, a link arm 240 integrally secured to the rod 230, and a base arm 250 pivotally connected with the link arm 240 and to which the seat base (not shown) is fixedly connected. A rotation of the motor M2 in the forward or reverse direction causes the nut unit 210 to move either forwardly or reversely along the threaded bolt $18_2$, thereby turning the rod 230 and the link arm 240 clockwise and counterclockwise, respectively, to thereby move the base arm 250 in the vertical direction.

FIG. 9a is an enlarged cross section of the nut unit 210 through a plane including the rod 230 while FIG. 9b shows a section thereof taken along the line IX- B—IXB. In these Figures, the nut is shown at 211 which meshes with a worm 212 mounted on a worm shaft 213 which is coupled with a motor shaft 214. FIG. 9c shows, in exploded perspective view, the coupling between the motor M2 and the nut unit 210. The motor M2 includes an end plate 216 on which a phototransistor unit $P_{sr}$, representing a photocoupler, is fixedly mounted. A rotary slitted disc 217 is fixedly mounted on the motor shaft 214, and a light emitting unit $P_{se}$ of the photocoupler is fixedly mounted on a fixing sleeve 215 in opposing relationship with the phototransistor unit $P_{sr}$ with the slitted disc 217 interposed therebetween. Consequently, when the motor M2 is fixedly mounted on the nut unit 210 as shown in FIG. 8, signals A and B of waveforms as shown in FIG. 9d are developed by the phototransistor unit $P_{sr}$ as the motor M2 rotates in the forward or reverse direction. These signals A, B are used to detect the direction of rotation of the motor M2 and to detect the attitude and the position, as will be further described later. It is to be understood that each of the motors M1, M2 described above as well as motors M3 to M5 to be described later is associated with a slitted disc and a sensor unit $P_{se}$, $P_{sr}$ to produce a pair of signals A, B from each motor unit.

The seat rear elevation adjusting mechanism 300 is constructed, in quite the same manner as the mechanism 200, and therefore will not be described in detail.

The seat back tilting mechanism 400 is generally similar to the seat forward/reverse drive mechanism and includes a nut unit and a motor M4. Referring to FIG. 7 for describing it, it includes a nut unit 410 which is secured to the seat base (not shown, but is fixedly mounted on a member 250). A threaded bolt $18_3$ threadably engages the nut unit 410, and has its one end pivotally connected to one end of a link arm 440, the other end of which is pivotally connected to a seat back arm 450 which is in turn fixedly mounted on the seat back frame. As the motor M4 rotates either forwardly or reversely, the seat back 12 is turned either clockwise or counter-clockwise.

Figure 10:
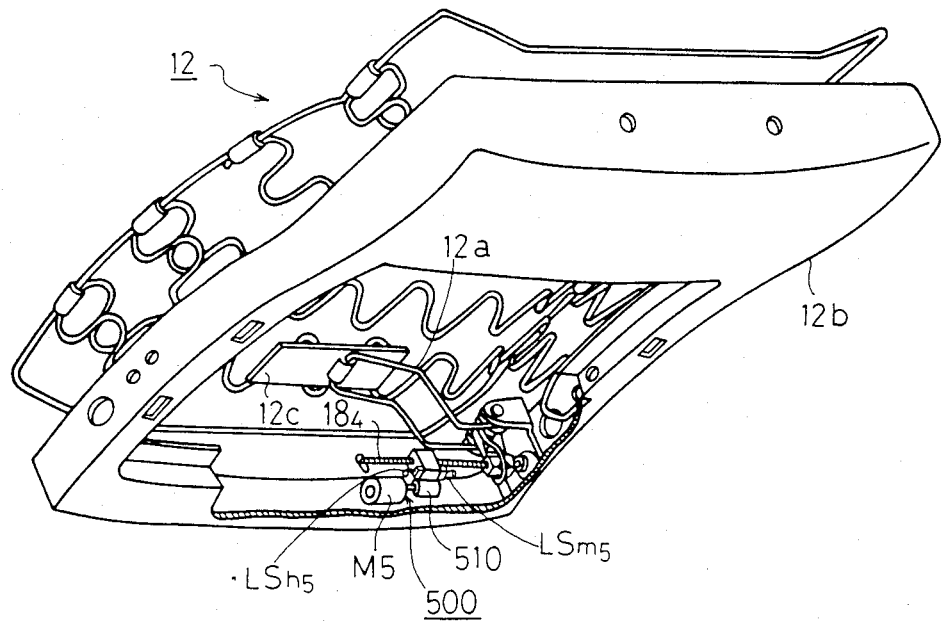
FIG. 10 is an exploded perspective view of a seat back 12.

Referring to FIG. 10, the seat back 12 includes a torsion spring 12a, the resilience of which is adjusted by the seat back cushion control mechanism 500. Specifically, a nut unit 510 is fixedly mounted on the seat back frame 12b, and is threadably engaged by a threaded bolt $18_4$, one end of which is coupled to one end of the torsion spring 12a. By rotating the motor M5 either forwardly or reversely, the threaded bolt translates to the left or right, whereby a lumber plated 12c coupled to the other end of the torsion spring 12a advances or retracts.

The five mechanisms which are used to establish a desired attitude include limit switches $LS_{h1}$-$LS_{h5}$ and $LS_{m1}$-$LS_{m5}$ which are located at the standby (or home) position and the maximum travel (limit position) and which are closed as a movable member moves close thereto.

It is to be noted that the driver's seat mechanism mentioned above remains the same as that disclosed in a pending U.S. patent application Ser. No. 235,173, filed Feb. 17, 1981 and entitled "Attitude Control System for Driver's Seat".

Figure 11:
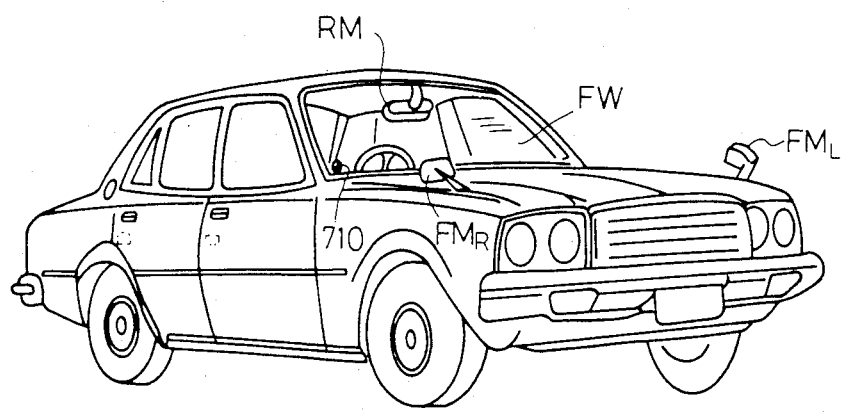
FIG. 11 is a perspective veiw showing the external appearance of a vehicle incorporating the devices according to the invention.

FIG. 11 shows a perspective view illustrating the appearance of the vehicle. In the present embodiment, both an interior room mirror RM and fender mirrors $FM_R$, $FM_L$ are angularly adjustable in an automatic manner.

Figure 12:
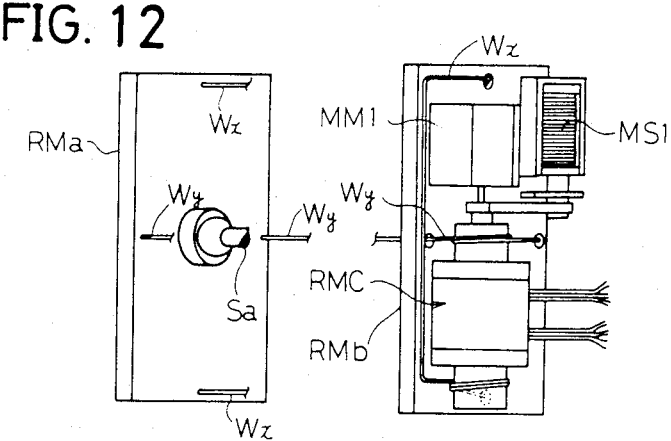
FIG. 12 is an exploded perspective view showing a schematic internal structure of a mirror attached on the vehicle.

FIG. 12 is an exploded perspective view of the internal mechanism of the room mirror RM. It includes a mirror support RMa, an x-axis and a y-axis drive wire Wx, Wy so as to permit a rotation of the support about the major and the minor axis thereof. The rear surface of the support RMa, that is, the opposite side from the mirror carrying surface, is integrally formed with a rotary ball bearing having a spherical depression formed therein, which receives part of a spherical head of a support arm Sa. The support arm Sa has a limb which is fixedly connected to a base member RMb. A motor MM1, a cluthc RMc, a solenoid MS1 and a wire guide pulley (not shown) are mounted on the base member RMb, with the wire Wy being disposed around the y-axis rotary shaft and the wire Wx disposed around the x-axis rotary shaft of the clutch RMc. When the solenoid MS1 is deenergized, the clutch RMc couples the rotary shaft of the motor MM1 with the x-axis rotary shaft while when the solenoid MS1 is energized, the rotary shaft of the motor MM1 is coupled to the y-axis rotary shaft. The clutch RMc includes a stationary barrel which houses a potentiometer PT1x coupled to the x-axis rotary shaft and another potentiometer PT1y coupled to the y-axis rotary shaft. Consequently, the angular position of the mirror RM can be expressed in terms of outputs from these potentiometers PT1x, PT1y. The construction of the fender mirrors $RM_R$, $FM_L$ is entirely the same as that of the room mirror RM, and these fender mirrors include solenoids MS2, MS3 and potentiometers PT2x, PT2y and PT3x, PT3y.

Figure 13A:
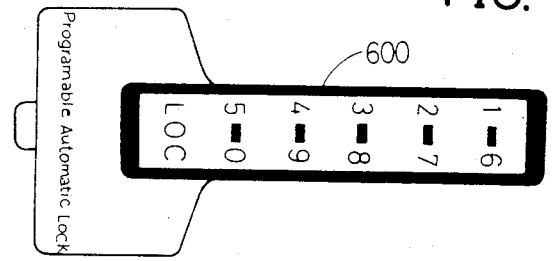
FIG. 13a is a plan view of a signal transmitter 600.
Figure 13B:
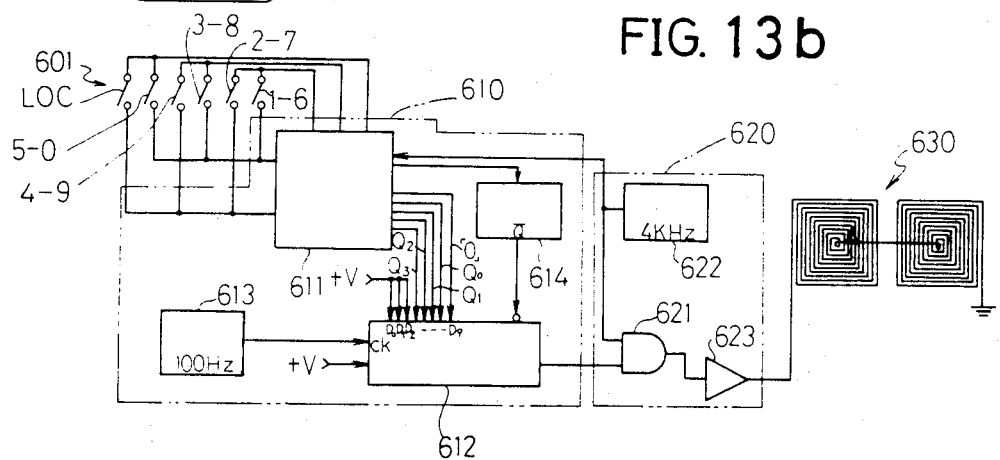
FIG. 13b is a block diagram showing electric elements incorporated within the signal transmitter 600.

FIG. 13a illustrates the appearance of a signal emitter 600. The emitter 600 includes a front panel, the surface of which is printed with six spiral electrodes which are disposed in longitudinal alignment, with an electrically conductive, resilient film which exhibits a high resistance placed thereon. The peripheral edge of the film is joined to the front panel. In regions which are located directly above the spiral electrodes, the resilient film is printed with designations "1-6", "2-7", "3-8", "4-9", "5-0" and "LOC", with the hyphens or the letter "O" directly in alignment with the printed electrodes. The spiral electrodes in six discrete zones and the resilient film constitute together six key switches 601. A printed circuit board which has a code generator 610, a modulator and a transmitting coil 630 formed thereon is disposed below the front panel. The transmitting coil 630 is formed of printed electrodes. The combination of these elements and key switches 601 is shown in FIG. 13b. The code generator 610 comprises a keyboard encoder 611 having connections with the key contacts, an 8-bit shift register 612, a low frequency clock pulse oscillator y13 and a monostable multivibrator 614. When one of the key contacts is closed, the keyboard encoder 611 produces a 4-bit code representing such key contact, and supplies it to four of eight bit-parallel input terminals of the shift register 612 and also triggers the monostable multivibrator 614. The multivibrator 614 produces a low level or "0" output for a given time duraction $T_{M1}$ once it is triggerred. During such time interval, the signals applied to the eight bit input terminals are stored in the shift register 612. When the output of the monostable multivibrator 614 returns to its high level or "1", the right bits are serially outputted at the serial output terminal of the shift register 612 with a period of an output pulse from the clock pulse oscillator 613. The output is in the form of "10XXXX111 ... ", with the four "X" bits representing a code corresponding to the key which has been operated. The output from the shift register 612 is passed through an AND gate 621 of the modulator 620 where it provides an amplitude modulation of an output carrier from a carrier oscillator 622. The modulated carrier is amplified by an amplifier 623 to a level suitable for transmission and then applied to the coil 630. As a result, an alternating magnetic field is produced in an on-off manner in accordance with the code and transmitted in a direction perpendicular to the plane of the coil 630.

A receiver terminal 710 which is used to detect the alternating magnetic field is joined to the front window FW of the vehicle (see FIG. 11). An enlarged cross section of the receiver terminal 710 is shown in FIG. 11b. It will be seen that the receiver terminal 710 essentially comprises a ferrite core 711 and a coil 712 disposed thereon. The coil 712 is connected to a receiver 720. In the embodiment shown, the combination of the receiver terminal 710 and the receiver 720 constitute together a receiver unit. When a key is operated after the emitter 600 is brought close to the receiver terminal 710 on the front window FW, a change in the magnetic field produced by the coil 630 is detected by the coil 712, and is amplified by an amplifier 721 in the receiver 720, whereby 4 kHz signal is derived through a filter 722. Thus, a signal analogous to the output from the code generator 610 is produced at the output terminal of the filter 722. The output from the filter 722 is amplified by an amplifier 724 and then demodulated by a demodulator 724 into a form which is analogous to the output from the shift register 612 for application to an NAND gate 725. An output from the demodulator 724 is amplified before it is applied to a comparator 726 where it is compared against a given voltage $V_{ref}$. If the output exceeds the given level, the output of the comparator 726 changes to its high level or "1" while if it is below the given level, the output remains "0". If the output from the demodulator 724 is at its high level or "1" when the output of the comparator is "1", the NAND gate produces a "0" output, whereby the demodulated code is outputted.

Figure 14:
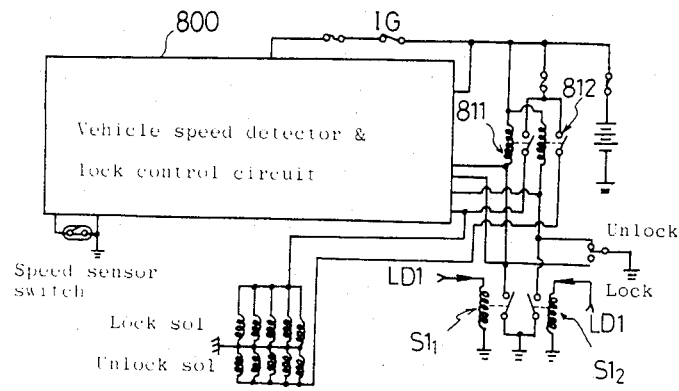
FIG. 14 is an electrical circuit diagram showing a door lock control circuit.

FIG. 14 shows a door lock control circuit associated with the doors on the vehicle. In the door lock control circuit shown, lock and unlock relays $S1_1$ and $S1_2$ are added. Numeral 800 represents a circuit which controls a lock operation in response to the detection of a vehicle speed while numerals 811 and 812 represent lock and unlock relays, respectively.

Figure 15:
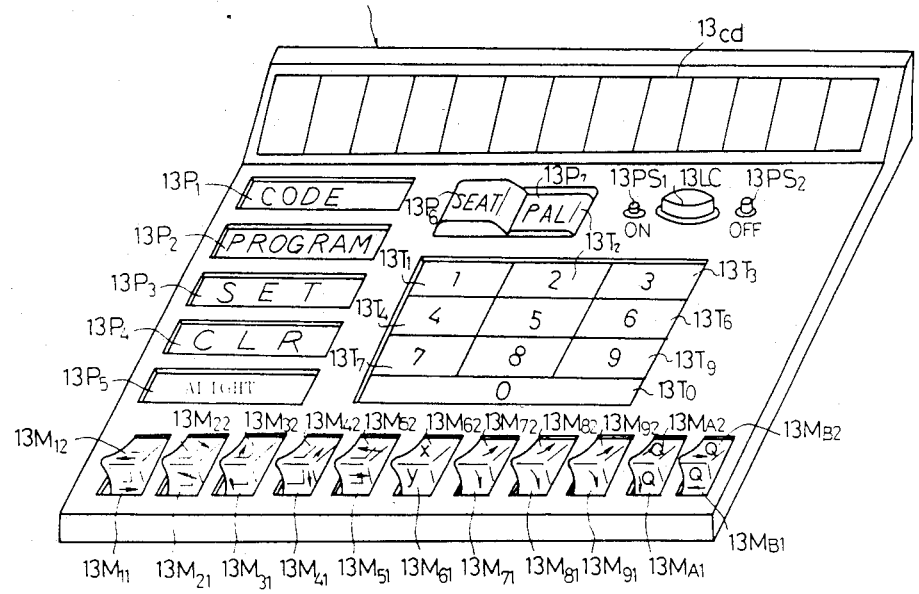
FIG. 15 is a perspective view showing the external appearance of a keyboard 13 equipped on the vehicle.

FIG. 15 is an enlarged perspective view of control panel 13. It will be noted that the control panel 13 is provided with a 13 digit 7-segment display 13cd, operation specifying keys $13P_1$–$13P_7$, adjusting switches $13M_{11}$–$13M_{B2}$, ten keys $13t_0$–$13t_9$ and keyboard power switches $13PS_1$, $13PS_2$. Light emitting diodes $LD_1$–$LD_{13}$ are mounted inside the key buttons of the operation specifying keys $13P_1$–$13P_7$, a power-on indicator cover 13LC and the ten keys $13t_1$–$13t_5$.

Figure 16A:
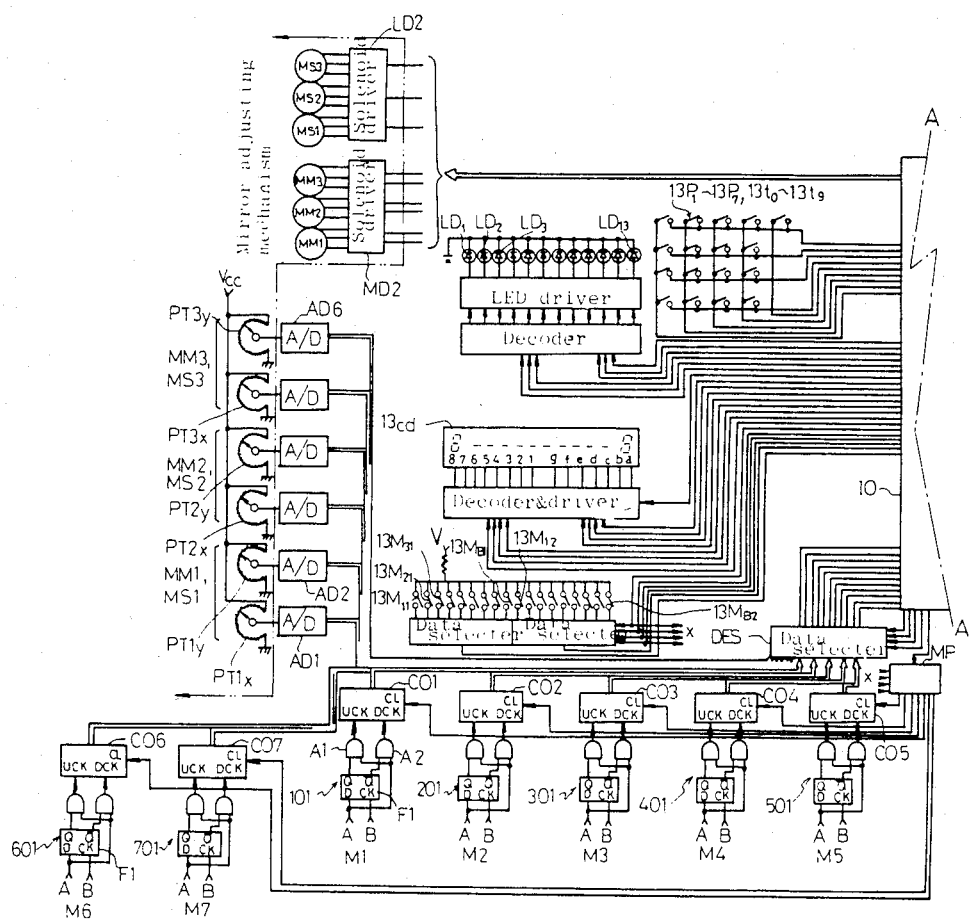
FIGS. 16a and 16b are block diagrams showing the combination of electric elements incorporated in the keyboard 13 and other electric elements, those circuits shown in the two drawings being connected to each other between the line A—A in FIG. 16a and the line B—B in FIG. 16b.
Figure 16B:
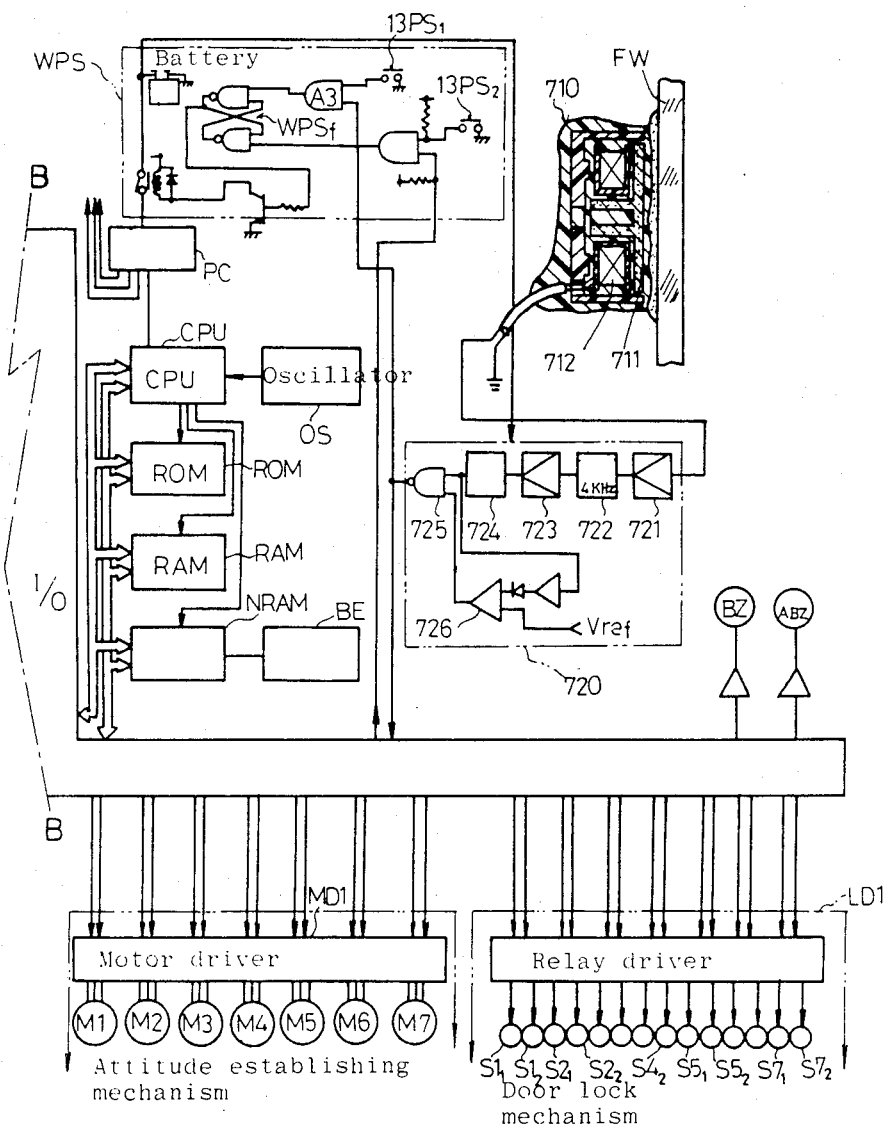

FIGS. 16a and 16b illustrate various combinations of electrical components mounted on the control panel. It is to be noted that both of these Figures are to be taken together by bringing a phantom line A—A shown in FIG. 16a into superimposition with another phantom line B—B shown in FIG. 16b. However, it should be noted that the power supply bus lines are omitted from illustration. It is to be noted in these Figures that the arrangement shown essentially comprises a microcomputer including a central processing unit CPU, a semiconductor read only memory ROM, a semiconductor read-write memory RAM, a non-volatile semiconductor read-write memory NRAM, a clock pulse oscillator OS, a battery backup unit BE, an input/output port I/O, a data bus and an address bus. Connected to the input/output port I/O are the switch terminals of the keys $13P_1$–$13P_7$ and then keys $13t_0$–$13t_9$, decorders for energizing the light emitting diodes $LD_1$–$LD_{12}$, a circuit for energizing the character display 13cd, a multiplexer for reading the adjusting switches $13M_{11}$–$13M_{B1}$, a data selector DES, a multiplexer MP, a relay driver, solenoid drivers $SL_1$, $LD_2$ and motor energizing circuits MD1, MD2. Input to the data selector DES are output codes from six A/D converters AD1–AD6 and count codes from seven up-down counters CO1–CO7, with these counters being cleared by an output from the multiplexer MP. The count pulse input of each of the counters CO1–CO7 is connected to up-down discriminating circuits 101–701, respectively. The up-down discriminating circuit 101 comprises a D-type flipflop F1 which is set as its CK input changes from its low level or "0" to "1" when its D input assumes a high level of "1" and which is reset as the CK input changes from "0" to "1" when the D input is "0". In addition, the discriminating circuit 101 comprises an AND gate A1 which receives Q output from F1 and signal A and having its output applied to an up count input of the counter CO1, and another AND gate A2 which receives $\overline{Q}$ output from the flipflop F1 and the signal A and having its output applied to the down count input of the counter CO1. As the motor M1 rotates in the forward direction, the signal A is applied as a count pulse to the up count input of the counter CO1. When the motor M2 rotates in the reverse direction, the signal A is applied as a count pulse to the down count input of the counter CO1. In this manner, a count in the counter CO1 represents a forward movement of the seat from its home position. Other circuits 202–207 are constructed in completely the same as the circuit 101. In this manner, the counts in the counters CO2–CO7 represent the height of the front portion of the seat, the height of the rear portion of the seat, the inclination of the seat back, the strength or degree of cushioning of the seat back (or the position of lumber plate 12c) the inclination of the steering wheel and the position or height of the steering wheel.

Considering the A/D converters AD1–AD6, the converters AD1 and AD2 indicate the angle of rotation of the room mirror RM about the x-axis and about the y-axis, respectively, the converters AD3 and AD4 indicate the angle of rotation of the fender mirror $FM_R$ about the x-axis and about the y-axis, respectively, and the converters AD5 and AD6 indicate the angle of rotation of the fender mirror $FM_L$ about the x-axis and about the y-aixs, respectively. The codes from these counters CO1–C05 and the A/D converters AD1–AD6 are sequentially and selectively input to the microcomputer through the data selector DES.

The minimize the power dissipation when the vehicle is at rest, a standby power supply circuit WPS is provided, which is normally turned on together with the receiver 720 while the remainder is turned off. When the power switch $13PS_1$ is momentarily closed or an output from the receiver 720 which normally assumes a high level or "1" changes to its low level or "0", AND gate A3 produces "0" output, which in turn sets a flipflop $WPS_f$ to energize a power relay, thereby feeding a voltage converter PC. The voltage converter PC in turn feeds various parts. When the power switch $13PS_2$ is momentarily opened, the flipflop $WPS_f$ is reset to deenergize the power relay, whereby the input to the voltage converter PC is interrupted. The diode $LD_{13}$ (which is contained within 13LC shown in FIG. 15) is illuminated during the time the flipflop $WPS_f$ is set or the microcomputer is fed.

The ROM of the microcomputer contains program data which detects any key depressed by detecting the closure of any switch contact which occurs in response to the depression of one of the keys $13P_1$–$13P_7$ and $13t_0$–$13t_9$; program data which latches the illumination of light emitting diode or diodes corresponding to the key or keys depressed; display program data for indicating the key number on the display 13cd; manual response, attitude changing program data for energizing the motors M1–M7, MM1–MM3 and the solenoids MS1–MS3 in response to the detection of closure of the switches $13M_{11}$–$13M_{B2}$; door lock control program data for energizing the relays $S1_1$–$S7_2$ in accordance with a code input; attitude establishing program data for energizing the motors M1–M7, MM1–MM3 and the solenoids MS1–MS3 in accordance with attitude data read from the non-volatile memory NRAM in response to a code input; program data for performing arithmetic operations and read- and write-operations of the non-volatile memory NRAM in response to key operations; and a variety of constants data. Of the primary importance among the constants data is attitude standard data. The operation of the microcomputer which is based on such data can be summarized as follows:

(a) Registration of a cipher word

When the key switches $13P_7$ and $13P_2$ are closed during the time the power switch $13PS_1$ is closed, "PAL P" is displayed on the most significant five digits of the display 13cd. Since it is assumed that five cipher words corresponding to keys No. 1–5 can be stored in the present embodiment, if one of keys $13_1$–$13_5$, for example, No. 2, is input subsequently, "PAL P2-" is displayed on the seven most significant digits of the display 13cd. If a cipher word is stored, for example, 90817 is stored in the No. 2 position, the word is added to the display at the five least significant digits, thus providing a total display of "PAL P2-90817". In the event a cipher word is not stored, "PAL P2-00000" is displayed. In any event, when an input from five of ten keys (five digits) is present under this condition, the first key input clears the display of the five least significant digits and causes the least significant digit to be replaced by the number of the input key. The digit display shifts to a next higher digit in response to each subsequent key input. For example, if the input is "13579", the final display will be "PAL P2-13579". When the SET key $13P_3$ is closed under this condition, a word "13579" (which comprises five codes) is stored in the second location within a cipher word storage region of the non-volatile memory NRAM. Upon completion of the registration, a buzzer BZ (see FIG. 16b) is energized for a given time interval, followed by deactivation of the display.

(b) Establishment of a standard driving attitude

When three digit numeral input, for example, 172, indicative of stature, is supplied by ten keys $13t_0$–$13t_9$ after the code key CODE $13P_1$ has been closed, "CO-172" is displayed, and attitude data containing numbers (170 and 175) which are close to the selected stature is read from the read only memory ROM, and standard data for the stature of 172 cm is calculated by interpolation. The driver's seat 10, the room mirror RM and the fender mirrors $FM_R$, $FM_L$ are set to an attitude which is represented by the standard data corresponding to the stature of 172 cm in response to the depression of SET key $13P_3$.

(c) Adjustment of attitude

When the switches $13M_{11}$–$13M_{51}$ are closed, the seat motors M1–M5 are energized for rotation in the forward direction during the time these switches remain closed. On the other hand, the seat motors M1–M5 are energized for rotation in the reverse direction in response to the closure of any one of the switches $13M_{12}$–$13M_{52}$. The mirror motors MM1–MM3 are energized for rotation in the forward direction in response to the closure of one of the switches $13M_{71}$–$13M_{91}$ while the mirror motors MM1–MM3 are energized for rotation in the reverse direction in response to the closure of one of the switches $13M_{72}$–$13M_{92}$. The tilt motor M6 and telescope motor M7 are energized for rotation in the forward direction in response to the closure of switches $13M_{A1}$, $13M_{B1}$ respectively while the tilt motor M6 and telescope motor M7 are energized for rotation in the forward direction in response to the closure of switches $13M_{A2}$, $13M_{B2}$ respectively. If the switch $13M_{62}$ is closed during the time when either one of the switches $13M_{71}$–$13M_{91}$ and $13M_{92}$–$13M_{92}$ is closed, the clutch coil MS1 is deenergized, causing the mirror to be driven either forwardly or reversely about the x-axis. If the switch $13M_{62}$ is closed, the clutch coil MS1 is energized, causing the mirror to be driven either forwardly or reversely about the y-axis. Accordingly, after the driver's seat 10 and the mirrors RM, $FM_R$, $FM_L$ have been set to the standard attitude, the switches $13M_{11}$–$13M_{B2}$ can be utilized to adjust the attitude.

(d) Storage of attitude

When PROGRAM key $13P_2$ is closed, those storage locations within the memory where no cipher word is stored, for example, the location Nos. 1, 3, 4 and 5 are displayed in the form of "PR-1345". If all of these storage locations store cipher words, a display "PR-2345" is produced excluding the first storage location where a cipher word is already stored. Subsequently, when one of the ten keys $13t_1$–$13t_5$, for example, $13t_3$ corresponding to "3", is closed, the counts in the counters CO-1–C07 and the output codes from the A/D converters AD1–AD6 are stored in the storage region No. 3 of the non-volatile memory NRAM except for an area where the cipher word is stored.

(e) Storage of leaving attitude

The seat and the mirrors are adjusted to the attitude which is assumed when leaving the vehicle, and PROGRAM key $13P_2$ is depressed and one of the ten keys is utilized to specify one of 1–5, for example, 3, followed by the depression of an alighting key $13P_5$. The subsequent depression of SET key $13P_3$ enable the codes in the counters CO1–C07 and the output codes of the A/D converters AD1–AD6 to be stored in storage location No. 3 of the nonvolatile memory NRAM in an area which is adjacent to the area where driving attitude data is stored.

(f) Door unlock

The signal emitter 600 (see FIGS. 13a and 13b) is brought close to the receiving terminal 710 (see FIGS. 11, 16a and 16b) and one of the key switches 1-6 to 5-0 and the LOC is closed, whereupon a code indicative of the key is transmitted from the coil 630 and intercepted by the receiver 720. AND gate 725 changes its output to a low level or "0" temporarily, whereby the flipflop $WPS_f$ of the backup battery circuit WPS (see FIG. 16b) is set, energizing the power relay, thus allowing the voltage converter PC to feed the microcomputer and its associated electrical circuit. When a cipher word is transmitted from the emitter 600 through a selective closure of the switches 1-6 to 5-0, the microcomputer checks if the cipher word coincides with one of the cipher words stored in the storage regions No. 1 to No. 5 of the non-volatile memory NRAM. When it finds coincidence, it waits for a next coming key code. If a code indicative of the key No. 1 (1-6) is applied, the door of the driver's seat is unlocked. If a code is applied which indicates the key No. 2 (2-7), the door associated with an assistant driver is unlocked. A code indicative of the key No. 3 (3-8) causes the door located behind the assistant driver's seat to be unlocked while the door located behind the driver's seat is unlocked in response to a code indicative of the key No. 4 (4-9). Finally, a tonneau cover is unlocked in response to a code indicative of the key No. 5 (5-0).

(g) Automatic establishment of attitude

When the door associated with the driver's seat is unlocked in response to an oncoming cipher word, the microcomputer then operates to read out the driving attitude data from the non-volatile memory NRAM at the storage location where the cipher word is stored. It then automatically establishes the attitude of the driver's seat and mirrors in accordance with such data. Similarly, when one of the ten keys $13t_1$–$13t_5$ on the keyboard 13 is closed after SEAT key $13P_6$ has been turned on, the driving attitude data stored in the non-volatile memory NRAM at the storage location number indicated by one of the ten keys is read out, and the attitude of the driver's seat, steering wheel and the mirrors is automatically established in accordance with such data.

(h) Automatic establishment of leaving attitude

When one of the ten keys $13t_1$–$13t_5$ is closed after the alighting key $13P_5$ has been turned on, the leaving attitude data stored in the non-volatile memory NRAM at the storage location number indicated by such key is read out, and the attitude of the driver's seat, steering wheel and the mirrors is automatically established in accordance with such data.

(i) Automatic door lock

The signal emitter 600 is brought close to the receiving terminal 710, and LOC key closed. In response to the application of a code indicative of the LOC key, the microcomputer operates to lock every door, followed by resetting the flipflop $WPS_f$ of the standby power supply circuit WPS.

(j) Display of registered cipher word

When PAL key $13P_7$ is turned on together with CODE key $13P_1$, followed by an input of a code indicative of the storage location number from one of the ten keys $13t_0$–$13t_9$, the cipher word (five digits) stored at such storage location is displayed on the display 13cd.

FIGS. 17a to 17g indicate flow charts illustrating the operation of the microcomputer. In these flow charts, the storage locations of the read only memory ROM where constants data is stored is referred to as memory 1, memory 2 . . . while storage locations within the non-volatile memory NRAM are referred to as non-volatile memory 1, 2 . . . . Storage locations within the random access memory are referred to as registers. Principal memories store contents as indicated in the Table below.

TABLE 2

| storage regious | Memories in ROM stored content |
|---|---|
| memory 1 | attitude data (in 13 codes) for stature of 140 cm |
| memory 2 | attitude data (in 13 codes) for stature of 145 cm |
| memory 3 | attitude data (in 13 codes) for stature of 150 cm |
| . | |
| . | |
| memory 12 | attitude data (in 13 codes) for stature of 195 cm |
| memory 13 | attitude data (in 13 codes) for alighting |

TABLE 3

| No. | storage regious | Memories in NRAM stored content |
|---|---|---|
| 1 | 1-1 | cipher word (five digits) |
|   | 1-2 | driving attitude data (13 codes inclusive of seat, steering wheel and mirrors) |
|   | 1-3 | leaving attitude data (13 codes) *cipher word memory 1 |
| 2 | 2-1 | cipher word (five digits) |
|   | 2-2 | driving attitude data (13 codes inclusive of seat, steering wheel and mirrors) |
|   | 2-3 | leaving attitude data (13 codes) *cipher word memory 2 |
| 3 | 3-1 | cipher word (five digits) |
|   | 3-2 | driving attitude data (13 codes inclusive of seat, steering wheel and mirrors) |
|   | 3-3 | leaving attitude data (13 codes) *cipher word memory 3 |
| 4 | 4-1 | cipher word (five digits) |
|   | 4-2 | driving attitude data (13 codes inclusive of seat, steering wheel and mirrors) |
|   | 4-3 | leaving attitude data (13 codes) *cipher word memory 4 |
| 5 | 5-1 | cipher word (five digits) |
|   | 5-2 | driving attitude data (13 codes inclusive of seat, steering wheel and mirrors) |
|   | 5-3 | leaving attitude data (13 codes) *cipher word memory 5 |
| 6 |  | current attitude data (13 codes) |
| 7 |  | number of key inputs |

TABLE 4

| storage regious | RAM stored content |
|---|---|
| register 1 | first digit of data displayed on display 13cd |
| register 2 | second digit of data displayed on display 13cd |
| . . | |
| . . | |
| register 8 | eighth digit of data displayed on display 13cd |
| register 9 (attitude register) | attitude data (13 codes) read from NRAM & ROM |
| register 10 | temporary data |
| . . | |
| . . | |
| register 20 | oncoming code from emitter 700 or input from keyboard 13 |
| register 21 | |
| register 22 | |
| register 23 | each oncoming code stored |
| register 24 | |
| register 25 | |
| register 26 | time count |

Referring to FIGS. 17a to 17g, a manipulation by the driver and a corresponding operation performed by the microcomputer will now be described. Initially the power switch 13PS is turned on to feed the microcomputer. In response thereto, the microcomputer turns on the power supplies associated with the various parts of the circuit in a given sequence, and clears memories contained in the internal RAM and the external RAM of the unit CPU. Also latches in the I/0 port are cleared(initialization). It then waits for a key input from the keyboard or a code transmitted from the signal emitter 600.

Figure 17A:
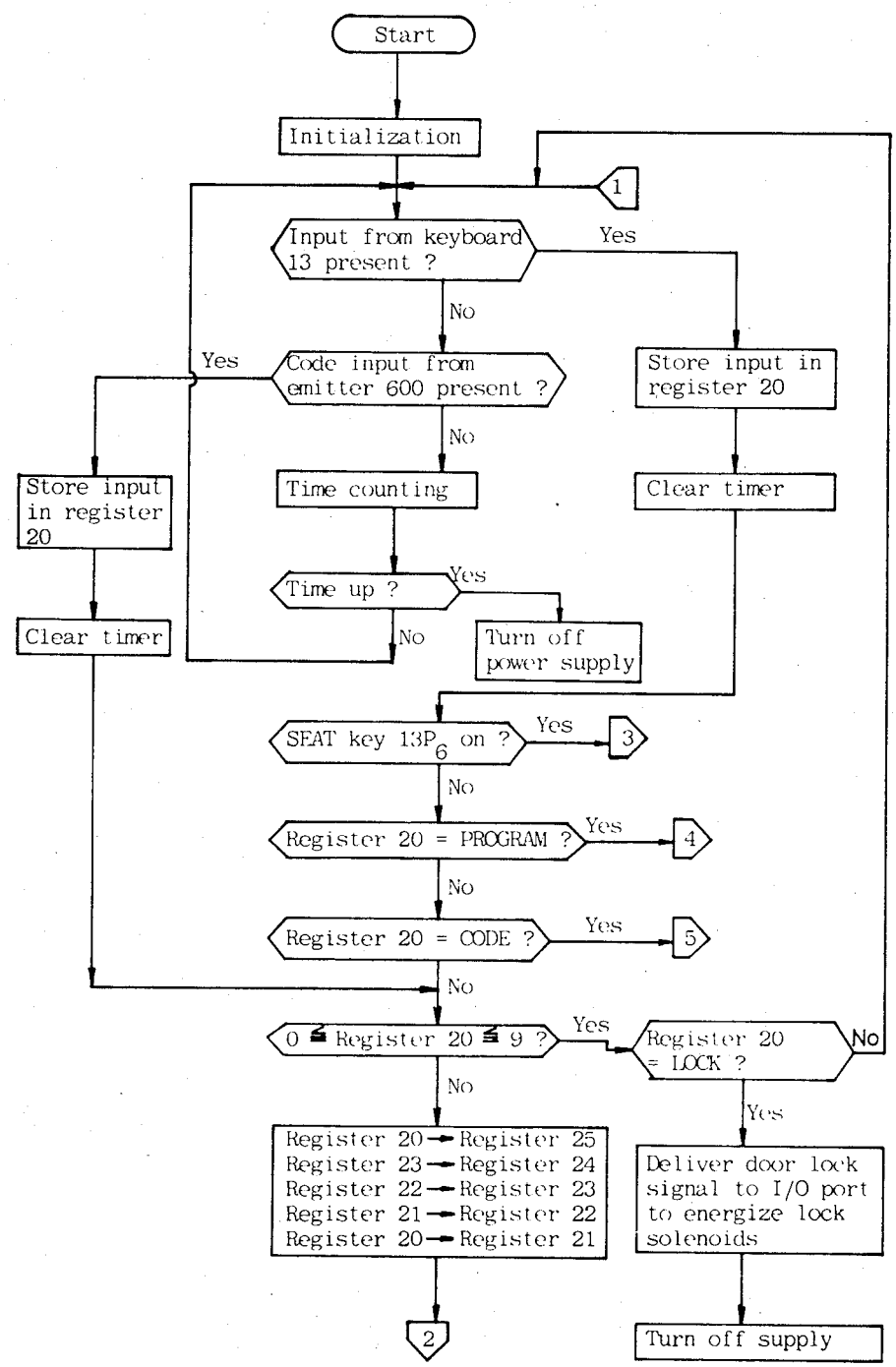

Initially considering the flow chart shown in FIG. 17a, a time counting is started together with a key input standby mode, and after a given time interval, the standby power supply circuit WPS is reset, thus interrupting the circuit WPS and other power supplies associated with circuits other than the receiver 720. However, if there is a key input from the keyboard 13 during such time interval or a code is inputted from the receiver 720, it is stored in the register 20 while clearing the time count register or timer.

An operation which occurs in response to a key input from the keyboard 13 includes the storage of a cipher word, the establishment and storage of a driving attitude, and the establishment and storage of a leaving attitude. On the other hand, an operation which occurs in response to a code input from the receiver 720 includes a door unlock operation, the establishment of a driving attitude and a door lock operation.

Figure 17B:
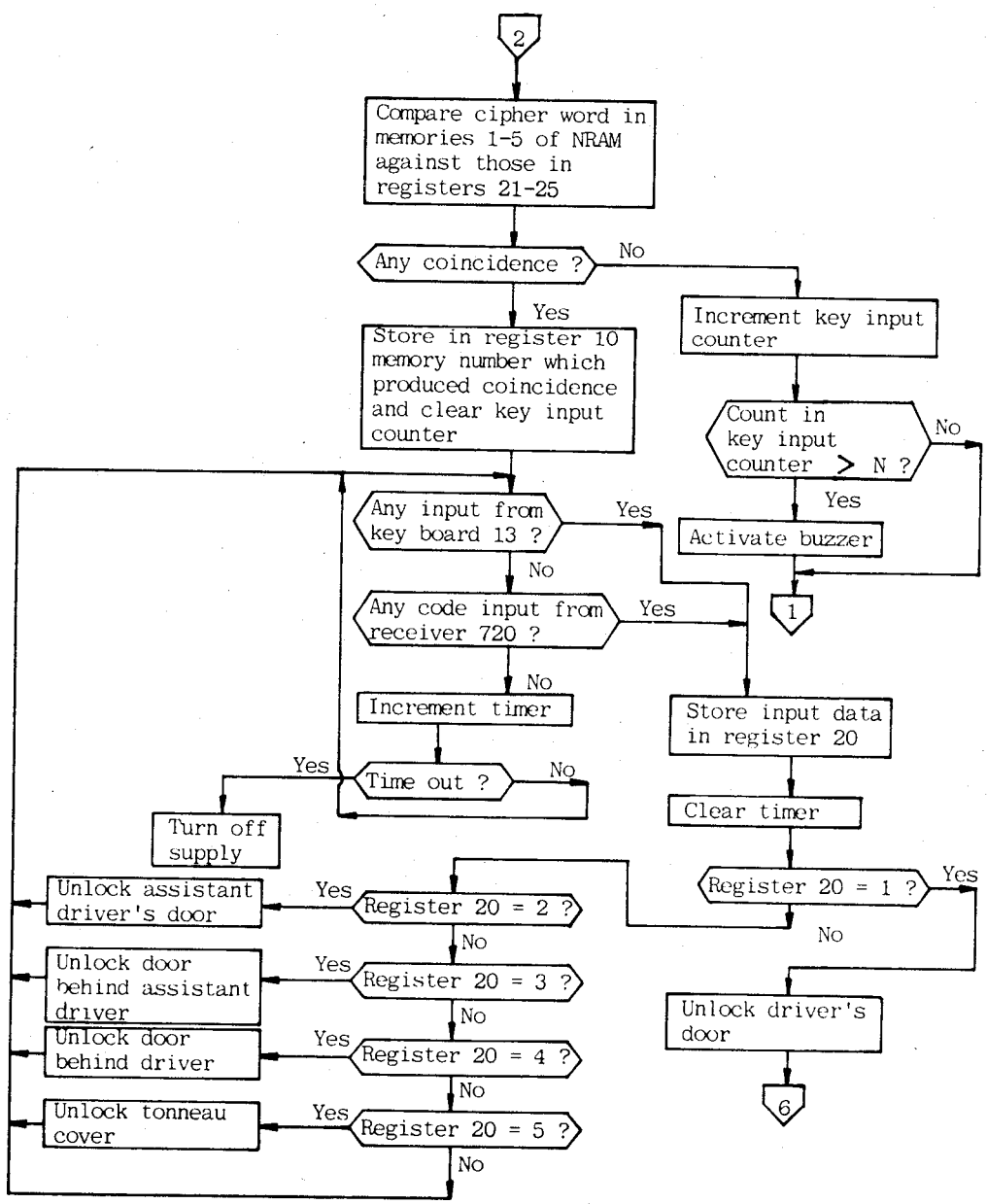
Figure 17C:
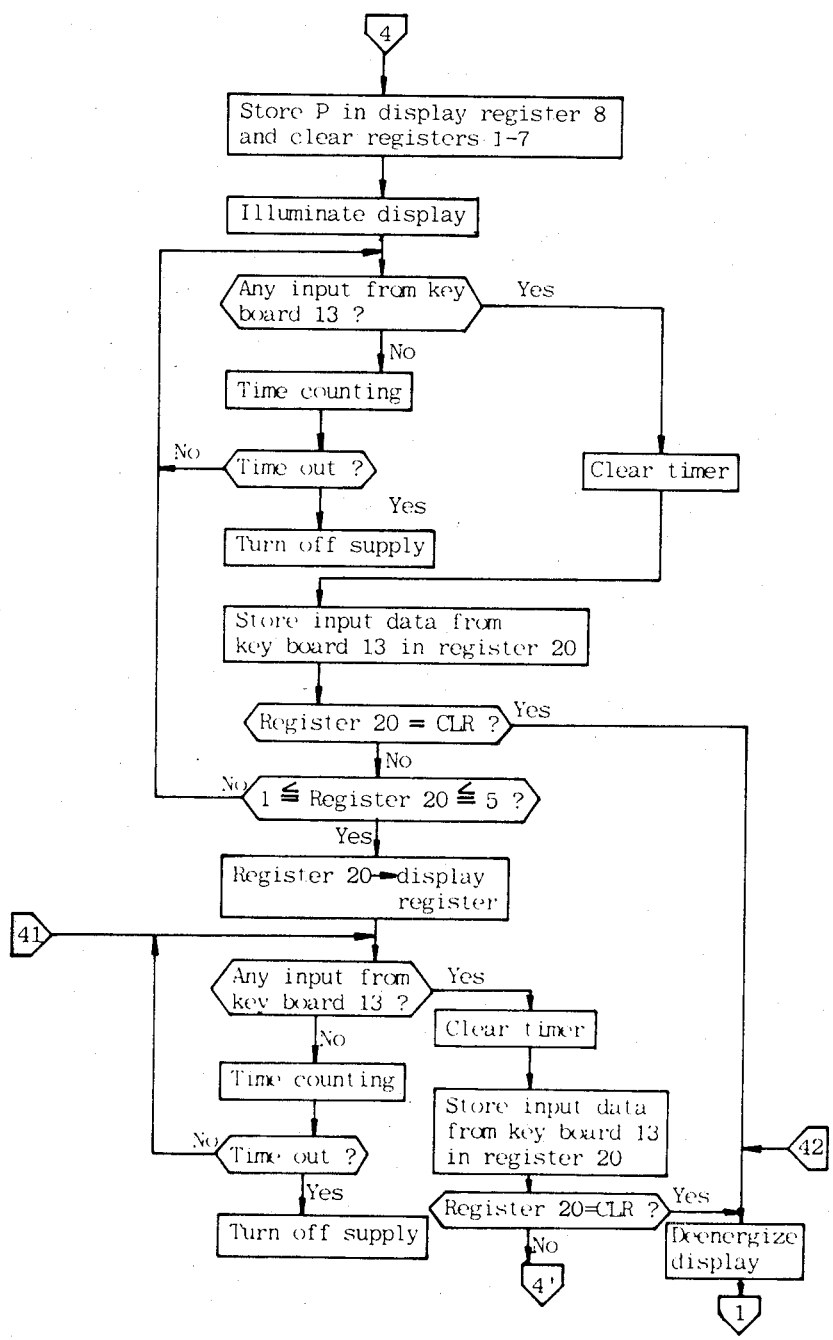
Figure 17D:
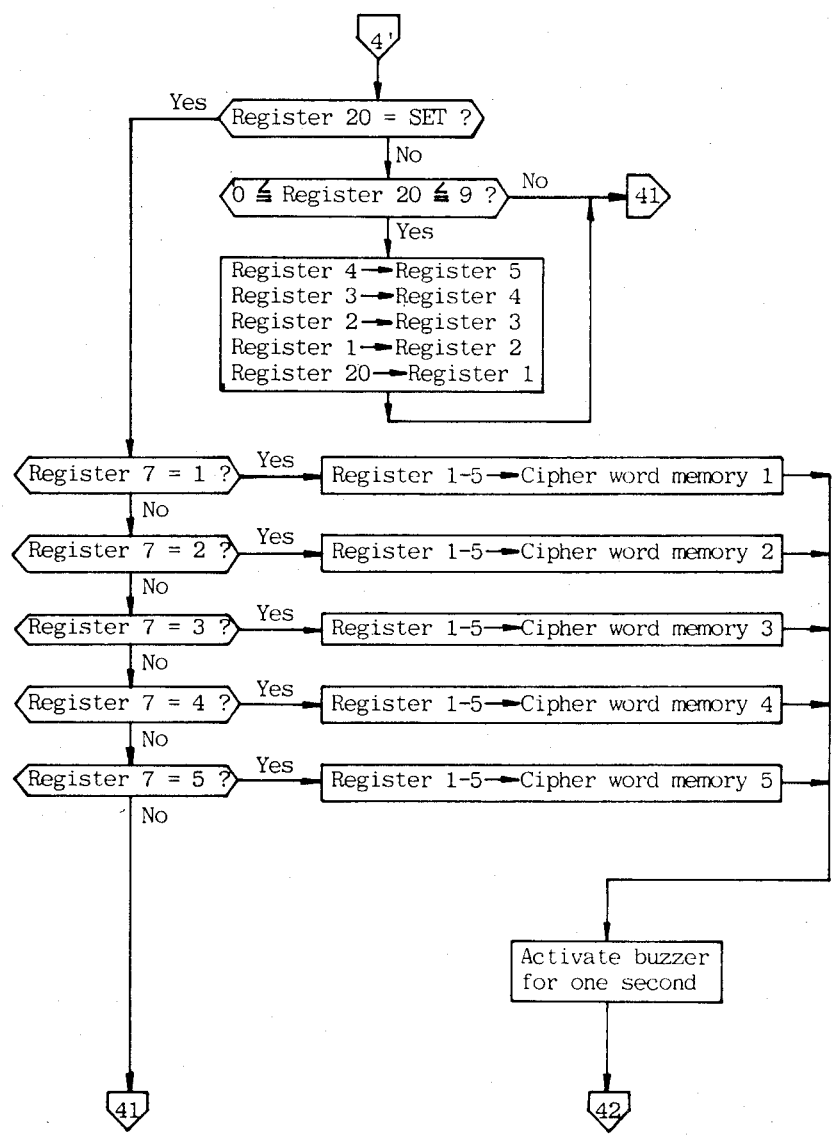
Figure 17E:
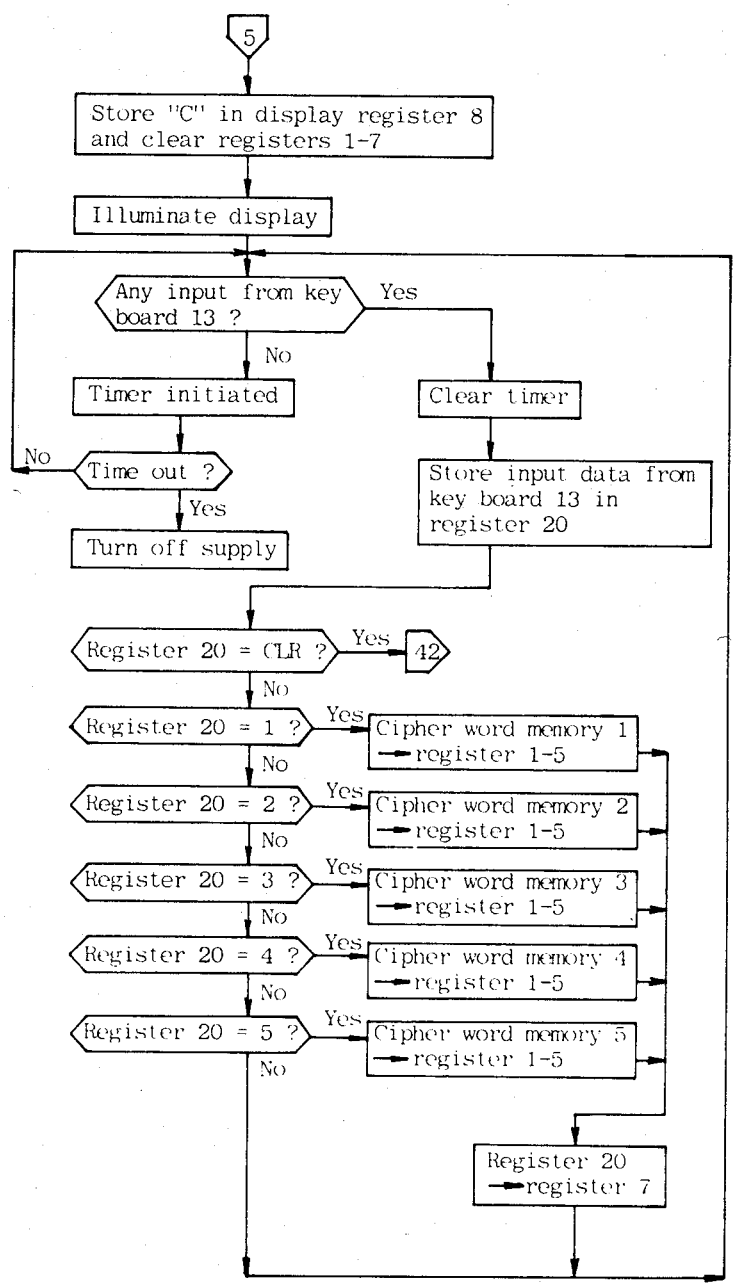
Figure 17F:
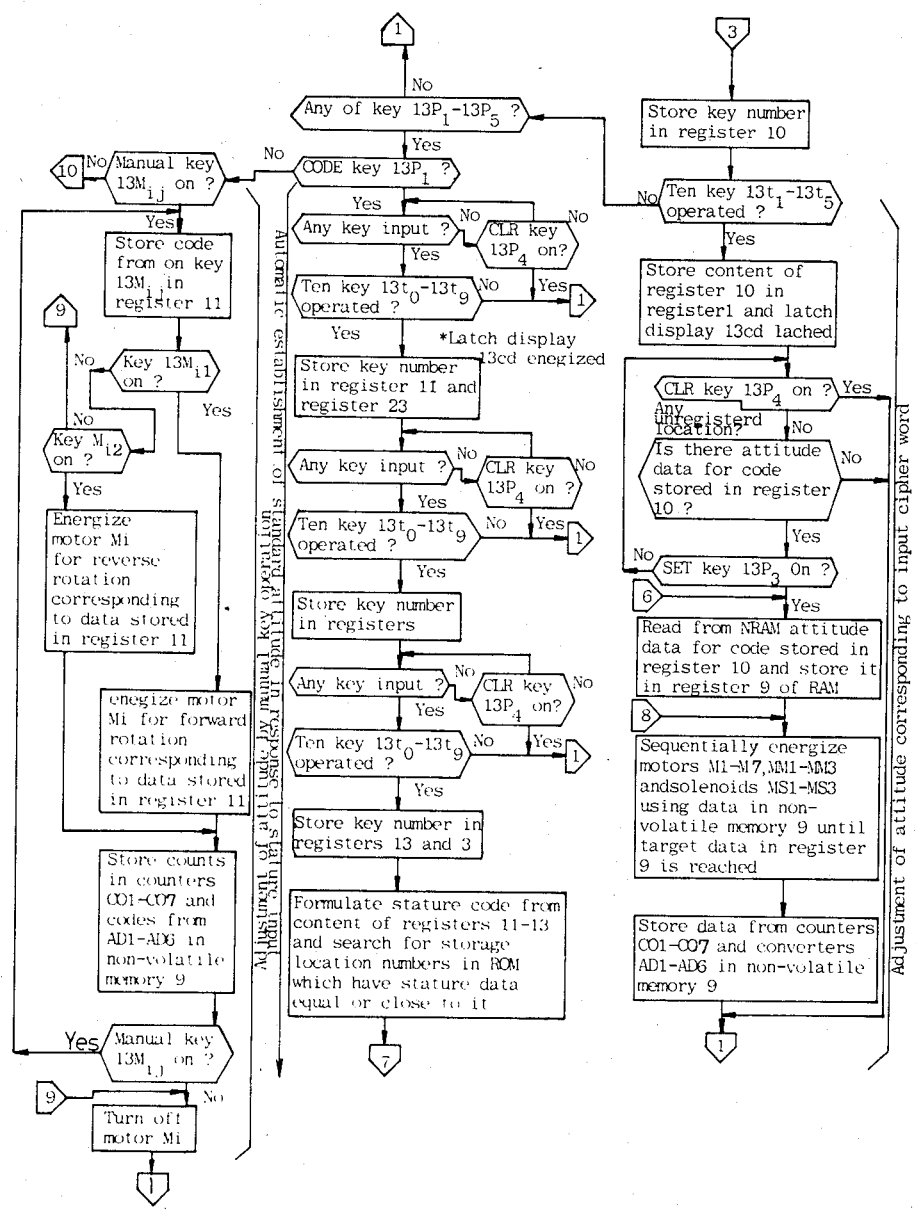
Figure 179:
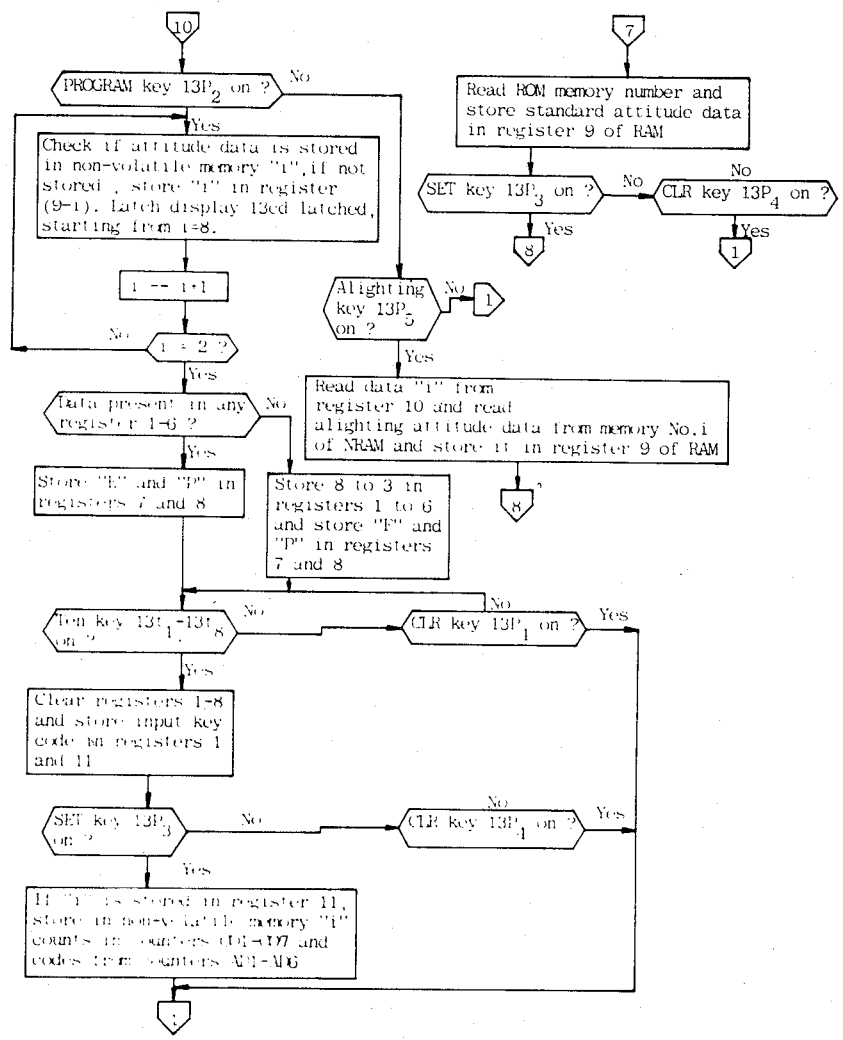

Assuming first that there is a key input from the keyboard 13, the first of which represents the turning on of SEAT key 13P$_6$, the operation proceeds to the flow charts shown in FIGS. 17f and 17g where the driving and the leaving attitude are established, adjusted and stored in the non-volatile memory NRAM. If the initial key operated is PROGRAM key 13P$_2$, the operation proceeds to the flow charts shown in FIGS. 17c and 17d where the cipher word is stored. If the initial key operated is CODE key 13P$_1$, the operation proceeds to the display of the cipher word as indicated in the flow chart of FIG. 17e.

If on the other hand there is a code input from the receiver 720, the operation proceeds to the door lock and the door unlock operation indicated in the flow charts shown in the later part of FIG. 17a and FIG. 17b.

Assuming that there is a code input from the receiver 720 (later part of FIG. 17a) which represents the LOC key (see FIG. 13a), the lock relays associated with all of the doors are energized to lock them, followed by resetting the standby power supply circuit WPS (see FIG. 16). If the input code represents a key other than LOC key, oncoming codes are sequentially stored in the registers 21 to 25, and an input word comprising a combination of five codes stored in the registers 21 to 25 is compared against the cipher words stored in the storage locations No. 1 to No. 5 of the non-volatile memory NRAM (FIG. 17b). If it coincides with one of the latter words, the number of the storage location where it is stored is stored in a register 10 while clearing a storage location No. 7 of the non-volatile memory NRAM. In the event of failure of finding a coincidence, 1 is added to the content of the storage location No. 7 of the non-volatile memory NRAM. When the content stored at the storage location No. 7 exceeds a given value N, an alarm buzzer ABZ (FIG. 16b) is energized. However, if the input word coincides with one of the cipher words, and the storage location number where it is stored is stored in the register 10, the microcomputer waits for the application of a door specifying code from the emitter 600 or waits for another key operation of the keyboard 13 while initiating a time counting. If there is no code input during a given time interval, the standby power supply circuit WPS is reset. If a code indicative of a numeral 1 is received from the receiver 720, the door associated with a driver's seat is unlocked. If a code indicative of one of the numerals 2 to 5 appears additionally or alternatively, a corresponding door such as the door associated with an assistant driver is unlocked. When the door associated with the driver's seat and a numeral code corresponding to 2 to 5 is supplied from the keyboard 13, a corresponding door is unlocked, thus permitting other doors to be unlocked through a key operation of the keyboard 13 within the vehicle in the same manner as it occurs in response to a code input from the receiver 720. The operation proceeds to the establishment of attitude shown in FIG. 17f when the door associated with a driver's seat is unlocked. The above covers the description of the flow chart relating to the door lock and the door unlock operation.

Referring to FIGS. 17c and 17d for describing the situation when PROGRAM key 13P$_2$ is turned on, the character "P" is displayed on the character display 13cd while initiating a time counting operation. When a given time interval has passed, the standby power supply circuit WPS is reset. However, if there is a ten key input during such time interval, it is stored in the register 20, and the numeral stored in the register 20 (representing the storage location number of the non-volatile memory NRAM) is displayed on the display 13cd. Each time numeral 0-9 is supplied by a subsequent ten key input, it is stored and the numeral is displayed on the least significant digit position while shifting the previously displayed digit to a next higher digit position. When SET key 13P$_3$ is depressed after a five digit input comprising a cipher word formed by five codes has been received (FIG. 17d), the cipher word is stored in an input storage location number.

When CODE key 13P$_1$ is turned on (FIG. 17e), the character "C" is displayed on the display 13cd, and any input 13t$_i$ from the ten keys 13t$_1$ to 13t$_5$ causes the cipher word stored at the storage location No. i of the non-volatile memory NRAM to be displayed on the display 13cd.

Referring to FIGS. 17f and 17g, if SEAT key 13P$_6$ is turned on and one of the ten keys 13t$_1$-13t$_5$, (which is represented as 13t$_i$) is turned on, the value "i" is stored in the register 10 and displayed on the display 13cd. The attitude data stored in the non-volatile memory NRAM at the storage location No. i is read out. When SET key 13P$_3$ is turned on, the motors M1-M7 associated with the driver's seat and the steering wheel, the motors MM1-MM3 associated with the mirrors and the solenoids MS1-MS3 are sequentially energized to establish the attitude of the seat and the mirrors in accordance with the data read out from the nonvolatile memory. If the driver depresses CODE key 13P$_1$ rather than operating the ten keys 13t$_1$-13t$_5$, the microcomputer latches the light emitting diode associated with the particular key illuminated, and stores the closure of the key switch 13P$_1$. The latched condition of illumination and the storage of the closure of the key switch 13P$_1$ are retained until another one of the keys 13P$_2$-13P$_5$ is turned on. The microcomputer then waits for an input from the ten keys 13t$_0$-13t$_9$, and when a three digit input representing the stature expressed in unit of cm is supplied, it is displayed on the display 13cd in the sequence the digits are supplied. Assuming that an input of "167" is supplied, the attitude data stored in memory 6 of the memory ROM (five codes representing the standard attitude corresponding to the stature of 165 cm) is stored in a register 14 while data stored in memory 7 of the memory ROM (five codes representing the standard attitude for the stature of 170 cm) is stored in a register 15. For each corresponding code, standard attitude code is calculated by interpolation for the stature of 167 cm, and is stored in a register 9. When the driver turns SET key $13P_3$ on, the storage of the turn-on of the key $13P_1$ is cleared, and the latched illumination of the associated light emitting diode is terminated. Instead, the turn-on of the key $13P_3$ is stored and its associated light emitting diode latched illuminated. The mechanisms 100 to 500 which are utilized to establish the attitude of the driver's seat, the rotating mechanisms associated with the mirrors RM, $FM_R$, $FM_L$ as well as the tilting mechanism and the telescoping mechanism associated with the steering wheel are sequentially energized and controlled. During such control, if it is assumed that data contained in a non-volatile memory 9 of NRAM which indicates the current position of the mechanism 100 is equal to "120" while the target data for the mechanism 100 which is stored in the register 9 is equal to "150", a positive difference $150-120=30$ causes the motor M1 to be energized for rotation in the forward direction until the count in the counter CO1 becomes equal to "150", whereupon the forward rotation of the motor M1 is terminated. If it is assumed that data in the non-volatile memory 9 is equal to "200" while the data in the register 9 is equal to "100", a negative difference of $100-200=-100$ causes the motor M1 to be energized for rotation in the reverse direction until the count in the counter CO1 becomes equal to "100", whereupon the reverse rotation of the motor M1 is terminated. If a limit switch LSm1 is turned on during the forward rotation, the latter rotation is terminated and inhibited during the time the limit switch remains on. Conversely, when a limit switch LSh1 is turned on, the reverse rotation is terminated and is inhibited during the time this limit switch remians on, and the counter CO1 is cleared at the time the limit switch is turned on. Such calculation and control of the energization of the motors take place sequentially with respect to the motors M1 to M7 and MM1 to MM3 and the solenoids MS1 to MS3. When such control is completed, all the registers are cleared or initialized and return to a key input standby mode. In this manner, by supplying stature information and depressing SET key, the seat 10 is automatically established to its standard attitude corresponding to the stature.

Secondly, considering a manual adjustment shown in the left-hand one-third of FIG. 17f, when either switch $M_{11}$–$M_{B2}$ is closed, the motors M1-M5, MM1-MM3 and motors M6, M7 are energized for forward rotation in response to the actuation of the switches $M_{11}$–$M_{51}$, $M_{71}$–$M_{91}$ and $M_{A1}$, $M_{B1}$ while they are energized for reverse rotation in response to the actuation of the switches $M_{12}$–$M_{52}$, $M_{72}$–$M_{92}$ and $M_{A2}$, $M_{B2}$. When the switch $M_{61}$ is turned on, the solenoids MS1-MS3 are deenergized while they are energized when the switch $M_{62}$ is turned. Accordingly, the closure of the switches $M_{11}$–$M_{B2}$ permits the various parts of the seat, steering wheel and the various mirrors to be adjusted in their attitude in an arbitrary manner.

Thirdly, considering the registration of attitude data corresponding to an identification code No. 1 to No. 5, the depression of PROGRAM key $13P_2$ by the driver causes the microcomputer to terminate the storage of the turn-on of other keys $13P_1$ and $13P_3$–$13P_5$ as well as the latched illumination of the associated light emitting diode while storing the turn-on of the key $13P_1$ and latching the illumination of its associated light emitting diode. The microcomputer then checks if there is attitude data in non-volatile memories No. 2–No. 5, and displays the number of memories having no attitude data therein on the first to the fourth digit of the display 13cd. If attitude data is absent in one of non-volatile memories No. 2–No. 5, the characters "E" and "P" are displayed on the seventh and the eighth digit, respectively. When each of the non-volatile memories No. 2–No. 5 contain attitude data, numerals 5 to 2 are sequentially displayed on the first to the fourth digit while the characters "F" and "P" are displayed on the seventh and the eighth digit, respectively. The microcomputer then waits for one of ten keys $13t_1$–$13t_5$ to be turned on, and when one of them is turned on, the display is cleared while displaying the number of the input key. Representing the number of input key by i, the counts in the counters CO1-C07 and the output codes from the A/D converters AD1-AD6 are stored as attitude data in the non-volatile memory No. i.

When the alighting key $13P_5$ is turned on, alighting attitude data is read from a memory No. i of the non-volatile memory NRAM where i represents a number stored in the register 10. The seat and the mirrors are established to an attitude indicated by such data. It should be noted that the alighting attitude data is stored in the memories No. 1–No. 5 of NRAM in the same manner as the driving attitude data is stored, but that the alighting key $13P_5$ must be turned on before PROGRAM key $13P_2$ and SET key $13P_3$ are turned on.

In the embodiment described above, five regions No. 1–No. 5 are assigned in the non-volatile memory NRAM to permit the storage of five sets of cipher words, driving attitude data and leaving attitude data. When one of the cipher words is transmitted from the emitter 600 followed by a code indicative of the number of the particular door to be unlocked when the vehicle is at rest and while the door remains closed, the particular door is unlocked and the attitude of the driver's seat, steering wheel and the mirrors are automatically established in accordance with attitude data which corresponds to the input cipher word. When one of the memories No. 1 to No. 5 receives an input in response to a key operation of the keyboard 13 within the vehicle, a corresponding attitude data is read from the non-volatile memory NRAM to provide an automatic establishment of the attitude of the driver's seat, steering wheel and the mirrors. Thus, the cipher word comprises an unlock code while the storage locations No. 1 to No. 5 of the non-volatile memory NRAM provides a manual code. However, once a cipher word is registered, a one-to-one correspondence is established between the number of the storage location of the non-volatile memory NRAM, the cipher word and the attitude data, so that the unlock code may comprise the number of the storage location with the non-volatile memory NRAM which represents a manual code, or conversely, the manual code may comprise an unlock code or a cipher word formed by a combination of unlock codes.

In the embodiment described above, an arrangement is made such that as soon as the door associated with the driver's seat is unlocked, the attitude of the driver's seat and the mirrors is automatically established in response thereto. However, the automatic establishment of the attitude can be conditioned upon a key operation of the keyboard 13.

As fully described hereinabove, according to the invention, the attitudes of the respective mechanisms can be accurately set to a state suitable for the then driver in an automatic manner upon some manipulation made by the driver, so long as a tilt angle of the steering mechanism and an attitude of the driver's seat are properly selected beforehand. Moreover, according to the preferred embodiments of the invention, the manipulation part of the steering mechanism is retreated to the away position when the driver rides on or alights from the vehicle, so that the riding and alighting of the driver will never be obstructed. After the riding, the manipulation part is automatically returned and accurately set to its desired attitude which fits well to the then driver.

What we claim is:

1. An attitude controlling device for a steering wheel comprising:
   a steering wheel attitude setting mechanism;
   a steering wheel driving means adapted to drive said steering wheel attitude setting mechanism;
   a position detecting means adapted to obtain attitude information of a steering wheel which is set by said steering wheel driving means;
   an attitude change instructing switch means adapted to instruct an attitude change of said steering wheel to said steering wheel driving means;
   a storage instructing switch means adapted to instruct the storage of the attitude information; and
   an electronic control device for storing the attitude information of said steering wheel in a memory in response to the actuation of said storage instructing switch means, for energizing said steering wheel driving means to away position in response to at least one of (a) the opening of a door at a driver's seat, (b) the turning off of a power switch by an engine key, and (c) the actuation of a manually operated AWAY switch, and for energizing said steering wheel driving means to driving position indicated by the stored attitude information in response to at least one of (a) the unlocking of the door at the driver's seat, (b) the closing of the door at the driver's seat, (c) the turning on of a power switch by an engine key, or (d) the actuation of a manually operated AWAY switch.

2. An attitude controlling device for a steering wheel according to claim 1, wherein said steering wheel attitude setting mechanism is a tilting mechanism.

3. An attitude controlling device for a steering wheel according to claim 2, wherein said tilting mechanism comprises a bolt having a toothed outer peripheral surface and rotated by the operation of said steering wheel driving means, and a movable member threadedly engaged with the toothed surface of said bolt.

4. An attitude controlling device for a steering wheel according to claim 1, wherein said steering wheel attitude setting mechanism is a telescoping mechanism for positioning said steering wheel in the upward or downward direction along an axis of its rotation.

5. An attitude controlling device for a steering wheel according to claim 4, wherein said telescoping mechanism comprises a bolt having the toothed outer peripheral surface and rotated by the operation of said steering wheel driving means, and a movable member threadably engaged with the toothed surface of said bolt.

6. An attitude controlling device for a steering wheel according to claim 1, wherein said steering wheel attitude setting mechanism is composed of a tilting mechanism and a telescoping mechanism.

7. An attitude controlling device for a steering wheel according to claim 6, wherein said tilting mechanism comprises a bolt having the toothed outer peripheral surface and rotated by the operation of said steering wheel driving means, and a movable member threadably engaged with the toothed surface of said bolt.

8. An attitude controlling device for a steering wheel according to claim 1, wherein said electronic control device includes a control panel disposed adjacent the center of said steering wheel.

9. An attitude controlling device for a steering wheel according to claim 8, wherein said electronic control device and a battery are electrically connected to each other through brushes and slip rings.

10. An attitude controlling device for a steering wheel according to claim 1, wherein said steering wheel driving means includes a motor.

11. An attitude controlling device for a steering wheel according to claim 10, wherein said position detecting means includes a pulse generator coupled to a rotating shaft of said motor for generating a pulse signal in accordance with a rotation of said motor.

12. An attitude controlling device for a steering wheel according to claim 11, wherein said pulse generator comprises a light emitting element and a light receiving element.

13. An attitude controlling device for a steering wheel according to claim 1, wherein said position detecting means includes at least one limit switch for detecting the away position of said steering wheel.

14. An attitude controlling device for a steering wheel according to claim 1, wherein said manually operated AWAY switch is used both as a switch means connected to said electronic control device to instruct the positioning of said steering wheel from the driving position to the away position as well as a switch means to instruct the positioning of said steering wheel from the away position to the driving position.

15. An attitude controlling device for a steering wheel according to claim 14, wherein said electronic control device, when said steering wheel locates at the driving position, performs a retreat control to the away position in response to an actuation of said manually operated AWAY switch, and when said steering wheel locates at the away position, performs a return control to the driving position.

16. An attitude controlling device for a steering wheel according to claim 1, wherein said electronic control device performs a retreat control of said steering wheel to the away position for each two opening operations of the door associated with the driver's seat, while said electronic control device performs a return control of said steering wheel to the driving position for each two closing operations of the door associated with the driver's seat.

17. An attitude controlling device for a steering wheel comprising:
   a steering wheel attitude setting mechanism including a telescoping mechanism for positioning a steering wheel in the upward or downward direction along an axis of its inclination and a tilting mechanism for setting the inclination of said steering wheel;
   a steering wheel driving means, coupled to both telescoping and tilting mechanism of said steering wheel attitude setting mechanism;

a position detecting means including a disc coupled to a rotating shaft of a motor in said steering wheel driving means and a detector for generating a pulse signal in accordance with a rotation of said disc;

a first attitude change instructing switch means for instructing a change in the vertical position of said steering wheel;

a second attitude change instructing switch means for instructing a change in the inclination of said steering wheel;

a storage instructing switch means for instructing the storage of attitude information relating to the vertical position and inclination of said steering wheel; and an electronic control device for storing the vertical position and inclination data in a memory in response to the actuation of said storage instructing switch means, for energizing said steering wheel driving means to away position in response to at least one of (a) the opening of a door associated with a driver's seat, (b) the turning off of a power switch by an engine key, and (c) the actuation of manually operated AWAY switch, and for energizing said steering wheel driving means to driving position indicated by the stored attitude information in response to at least on of (a) the unlocking of the door associated with the driver's seat, (b) the closing of the door associated with the driver's seat, (c) the turning on of a power switch by the engine key, and (d) the actuation of a manually operated AWAY switch.

18. An attitude controlling device for a steering wheel according to claim 17, wherein said manually operated AWAY switch is connected to said electronic control device and is used both as a switch means to instruct the positioning of said steering wheel from the driving position to the away position as well as a switch means to instruct the positioning of said steering wheel from the away position to the driving position.

19. An attitude controlling device for a steering wheel according to claim 18, wherein said electronic control device instructs the positioning of said steering wheel to the away position, and then performs a retract control to the away position when said steering wheel locates at the driving position and said common switch means is actuated, and said electronic control device instructs the positioning of said steering wheel to the driving position, and then performs a return control to the driving position when said steering wheel locates at the away position and said common switch means is actuated.

20. An attitude controlling device for an adjustable steering wheel and an adjustable seat in a vehicle comprising:

a portable code transmitter including a plurality of switches and a code generator for generating a code in accordance with the actuated switches;

a receiver mounted on said vehicle for receiving the code generated and transmitted from said code transmitter;

a power switch for an engine in said vehicle adapted to be controlled by an engine key;

a steering wheel attitude setting device operatively connected to said adjustable steering wheel, a seat attitude setting device operatively connected to said adjustable seat, a doorlocking control device on said vehicle and position detecting means associated with said steering wheel, said seat and said door locking control device to provide output signals in accordance with the attitudes of said steering wheel and said seat and the condition of said doorlocking control device; and an electronic control device having means for generating and memory means for storing a door locking code and attitude information with respect to said steering wheel and said seat associated with a driver's code for at least one driver;

said electronic control device having means for energizing said door control device in an unlocking mode upon receipt of a code from said transmitter identical to the stored door unlocking code;

said electronic control device having further means for energizing said steering wheel attitude setting device and positioning said steering wheel to an away position upon the occurance of at least one of (a) the opening of a door on said vehicle adjacent the driver's seat, (b) the turning off of a power switch by said engine key, and (c) the actuation of a manually operated AWAY switch; and said electronic control device having still further means for reading out the stored attitude information for said steering wheel and said seat from said memory means corresponding to a stored driver's code upon receipt of said stored driver's code and controlling said steering wheel attitude device and said seat attitude setting device in accordance with said attitude information for setting said steering wheel and said seat to the respective attitudes indicated by said read-out attitude information associated with a particular driver's code.

21. An attitude controlling device for a steering wheel according to claim 20, wherein said door unlocking code is identical to said driver's code.

22. An attitu,de controlling device for a steering wheel according to claim 20, wherein said electronic control device energizes said door locking control device in a locking mode in accordance with a code representing the actuation of at least one switch of said code transmitter.

* * * * *